United States Patent
Kusakabe et al.

(10) Patent No.: US 10,634,083 B2
(45) Date of Patent: Apr. 28, 2020

(54) DRIVE DEVICE FOR FUEL INJECTION DEVICE

(71) Applicant: Hitachi Automotive Systems, Ltd., Hitachinaka-shi, Ibaraki (JP)

(72) Inventors: Ryo Kusakabe, Hitachinaka (JP); Tomoaki Horii, Hitachinaka (JP); Shingo Kimura, Hitachinaka (JP); Takaki Itaya, Hitachinaka (JP); Mitsuru Nagase, Hitachinaka (JP); Shirou Yamaoka, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/197,152

(22) Filed: Nov. 20, 2018

(65) Prior Publication Data

US 2019/0085783 A1 Mar. 21, 2019

Related U.S. Application Data

(63) Continuation of application No. 15/527,060, filed as application No. PCT/JP2015/076600 on Sep. 18, 2015, now Pat. No. 10,161,339.

(30) Foreign Application Priority Data

Nov. 19, 2014 (JP) .................................. 2014-234099

(51) Int. Cl.
*F02D 41/20* (2006.01)
*F02D 41/00* (2006.01)
(Continued)

(52) U.S. Cl.
CPC ........... *F02D 41/20* (2013.01); *F02D 41/008* (2013.01); *F02D 41/3809* (2013.01);
(Continued)

(58) Field of Classification Search
CPC ...... F02D 41/20; F02D 41/402; F02D 41/401; F02D 41/3809; F02D 41/008;
(Continued)

(56) References Cited

U.S. PATENT DOCUMENTS 5,245,261 A * 9/1993 Ashley ................ H01L 27/0248
257/467
5,931,285 A * 8/1999 Madsen .................. G05D 19/02
198/761

(Continued)

FOREIGN PATENT DOCUMENTS

DE 10 2005 017 019 A1 11/2005
JP 2004-068606 A 3/2004
(Continued)

OTHER PUBLICATIONS

Extended European Search Report issued in corresponding application No. 15 86 1043, dated Jun. 6, 2018.

*Primary Examiner* — Joseph J Dallo
(74) *Attorney, Agent, or Firm* — Foley & Lardner LLP

(57) ABSTRACT

The objective of the present invention is to correct deviation in the injection amount and changes in the injection timing when the voltage of a high-voltage source for a drive device decreases. This drive device for a fuel injection device is equipped with a function whereby, when the pulse width of the injection pulse is set to an energization time 815 that closes a valve after a drive current has been switched to a maintenance current, the injection pulse width when the voltage of a high-voltage source has decreased is corrected so as to be longer than the injection pulse width when the voltage of the high-voltage source has not decreased, and, when the pulse width of the injection pulse is set to an energization time 804' that closes the valve before the drive current has been switched to the maintenance current, the absolute value of the amount of correction of the injection (Continued)

pulse width is made smaller than when the injection pulse width is set to the energization time 815 that closes the valve after the drive current has been switched to the maintenance current.

18 Claims, 12 Drawing Sheets

(51) Int. Cl.
    *F02D 41/38*       (2006.01)
    *F02D 41/40*       (2006.01)
    *F02M 51/06*       (2006.01)

(52) U.S. Cl.
    CPC ......... *F02D 41/401* (2013.01); *F02D 41/402* (2013.01); *F02M 51/061* (2013.01); *F02D 2041/2003* (2013.01); *F02D 2041/2017* (2013.01); *F02D 2041/2027* (2013.01); *F02D 2041/2051* (2013.01); *F02D 2041/2082* (2013.01); *F02D 2041/389* (2013.01); *F02D 2200/0602* (2013.01); *Y02T 10/44* (2013.01)

(58) Field of Classification Search
    CPC ..... F02D 2041/2051; F02D 2041/2027; F02D 2041/2003; F02D 2200/0602; F02D 2041/389; F02D 2041/2082; F02D 2041/2017; F02M 51/061; Y02T 10/44
    See application file for complete search history.

(56) References Cited

U.S. PATENT DOCUMENTS

| | | | |
|---|---|---|---|
| 6,208,497 B1* | 3/2001 | Seale | ............ F01L 9/04 |
| | | | 361/154 |
| 2001/0043450 A1* | 11/2001 | Seale | ............ F01L 9/04 |
| | | | 361/160 |
| 2005/0126534 A1 | 6/2005 | Kikutani | |
| 2011/0251778 A1 | 10/2011 | Saito et al. | |
| 2013/0112172 A1 | 5/2013 | Toyohara et al. | |
| 2014/0067233 A1 | 3/2014 | Nishida | |
| 2014/0110508 A1 | 4/2014 | Dames | |
| 2014/0316679 A1 | 10/2014 | Nishida | |
| 2016/0131074 A1 | 5/2016 | Nakano | |
| 2016/0177855 A1* | 6/2016 | Kusakabe | ......... F02D 41/20 |
| | | | 123/490 |
| 2016/0281624 A1 | 9/2016 | Dames | |
| 2017/0002765 A1* | 1/2017 | Nakano | ............ F02D 41/34 |
| 2018/0149124 A1* | 5/2018 | Yanoto | ............ F02D 41/20 |
| 2018/0328305 A1* | 11/2018 | Yanoto | ............ F02D 41/20 |

FOREIGN PATENT DOCUMENTS

| | | |
|---|---|---|
| JP | 2005-171928 A | 6/2005 |
| JP | 2011-052631 A | 3/2011 |
| JP | 2011-220244 A | 11/2011 |
| JP | 2013-100748 A | 5/2013 |

* cited by examiner

DRIVE DEVICE FOR FUEL INJECTION DEVICE

CROSS-REFERENCE TO RELATED APPLICATIONS

This application is a continuation of U.S. patent application Ser. No. 15/527,060, filed May 16, 2017, which is a National Stage Application of PCT/JP2015/076600, filed Sep. 18, 2015, which claims the benefit of and priority to Japanese Patent Application No. 2014-234009, filed Nov. 19, 2014, the entire contents of each of which are incorporated herein by reference.

TECHNICAL FIELD

The present invention relates to a drive device for driving a fuel injection device of an internal combustion engine.

BACKGROUND ART

In recent years, with the strengthening of exhaust regulation, in engines, suppression of the total amount of unburnt particles (PM: Particulate Matter) during mode running and suppression of the number of unburned particles (PN: Particulate Number) which is the number thereof are required, so that a fuel injection device capable of controlling a minute injection amount is required. As a means for suppressing the generation of unburned particles, it is effective to inject the fuel spray during one combustion stroke dividedly into a plurality of times (hereinafter referred to as split injection). By performing split injection, adhesion of fuel to a piston and cylinder wall surface can be suppressed, so the injected fuel is liable to be vaporized; accordingly, it is possible to suppress the total amount (PN) of unburned particles and the number of unburned particles, which is the number thereof. In an engine that performs split injection, it is necessary to inject dividedly into a plurality of times the fuel that has been injected at one time; therefore, in the fuel injection device, it is necessary to control a minute injection amount as compared with the conventional fuel injection device. Further, in multistage injection, it is easy to obtain the effect of suppressing the number of unburned particles by increasing the number of injections; therefore, improvement of responsiveness of the fuel injection device and reduction of interval of fuel injection during the combustion stroke are required.

Generally, the injection amount of the fuel injection device is controlled by a pulse width of an injection pulse output from an engine control unit (ECU). A normally closed electromagnetic fuel injection valve (electromagnetic fuel injection device) has biasing means for generating a force in a valve closing direction. A drive portion includes a coil, a core and a mover. By supplying a current to the coil, a suction force is generated between the core and the mover. When the suction force exceeds the force in the valve closing direction, a valve body separates from the valve seat and a valve opening starts. Subsequently, by stopping the current supply to the coil, a valve closing starts when the suction force generated between the core and the mover decreases and becomes smaller than the force in the valve closing direction. Generally, in order to quickly shift from the closed valve state to the valve open state, a drive circuit of the electromagnetic fuel injection device first applies a high voltage from a high voltage source to the coil when the injection pulse is output, and then performs control to rapidly raise the current of the coil. Thereafter, after the mover moves away from the valve seat and moves in the direction toward the core, switching control is performed so that a constant current is supplied to the coil by switching the application of the voltage to a low voltage. In many cases, the high voltage source stores the voltage of a low voltage source; however, in the case of performing re-injection of fuel under a condition that the injection interval of a multistage injection becomes small and the voltage value of the high voltage source does not return to the initial value, a current value flowing through the coil varies depending on a difference in the voltage applied to the coil, and the injection amount variation may occur even under a condition of supplying the same injection pulse width.

As a means for suppressing variation in the injection amount as described above, there is a method disclosed in Patent Literature 1. Patent Literature 1 discloses a control method that estimates a voltage applied to a coil and lengthens a command injection period according to a decrease amount when the estimated value is lower than a specified value.

Further, for example, Patent Literature 2, discloses a control device of a fuel injection device that measure a time Tp from the start of energization until a current reaches a peak current value, and delays the energization stop by a delay time than the falling time of an injection command signal, as the amount of time Tp is longer than the reference value.

PRIOR ART DOCUMENT

Patent Literature

PTL 1: JP 2005-171928 A
PTL 2: JP 2011-52631 A

SUMMARY OF THE INVENTION

Technical Problem

In the fuel injection device, by supplying and stopping a drive current to a solenoid (coil), a magnetic attraction force is generated and/or extinguished in the mover to open and/or close the valve body. Under a condition of multistage injection, the time from the stop of fuel injection of the other cylinder to the next fuel injection is shortened so that the voltage of a high voltage source of a drive device does not return to an initial value; accordingly, it is necessary to inject fuel under a condition that the applied voltage to the coil is small. However, under a condition that high voltage decreases, the current flowing through the coil decreases and the magnetic attraction force acting on the mover decreases, so that the time until the valve body opens becomes long, and the injection amount injected before the valve opens decreases. Under a condition that the injection pulse is stopped when after reaching the switching control period such that the injection pulse is large or the voltage applied to the coil is switched to the low voltage and constant current is supplied, in the case where the voltage of the high voltage source is lower than when the voltage does not decrease, the injection amount decreases as the time until the valve body opens becomes longer.

On the other hand, in multistage injection, it is important to reduce variation in the injection amount in a range where the controllable injection amount is small. In this range, the change in the injection amount in the case where the voltage of the high voltage source drops is smaller than in the range where the injection pulse is large, or the injection amount may become larger in the case where the voltage decreases. Therefore, in order to suppress variation in the injection amount caused by the voltage of the high voltage source decreasing in a region where the controllable injection amount is small and in the region where the injection pulse width is large, it has been necessary to change the correction method of the injection pulse depending on the range of the injection pulse and the value of the drive current.

An object of the present invention is to correct variation in the injection amount and injection timing in the case where the voltage of the high voltage source of the drive device decreases.

Solution to Problem

In order to solve the above problem, the present invention provides a drive device for a fuel injection device, the drive device being configured to open a valve body of an electromagnetic fuel injection device by energizing a solenoid to apply a magnetic attraction force between a fixed core and a mover, the drive device including a function of applying a high voltage to the solenoid when the valve body opens, and after the drive current flowing through the solenoid reaches a predetermined current value, switching the drive current to a holding current smaller than the predetermined current value to maintain a valve open state, the drive device for the fuel injection device being configured to generate an injection pulse and control a time for energizing the solenoid with a pulse width of the injection pulse, the drive device including a function of, when the pulse width of the injection pulse is set to an energization time at which the valve body is closed after the drive current is switched to the holding current, correcting the pulse width of the injection pulse in the case where the fuel injection timing or the fuel injection period overlaps between the cylinders so as to be longer than the pulse width of the injection pulse in the case where the fuel injection timing or the fuel injection period does not overlap, and when the pulse width of the injection pulse is set to an energization time at which the valve body is closed before the drive current is switched to the holding current, in comparison with the case where the pulse width of the injection pulse is set to the energization time at which the valve body is closed after the drive current is switched to the holding current, reducing an absolute value of the correction amount of the pulse width of the injection pulse.

Advantageous Effects of Invention

According to the present invention, when the voltage of the high voltage source generating the high voltage decreases, the correction amount of the injection amount can be appropriately determined according to the range of the injection pulse width; therefore, it is possible to suppress variation in the injection amount due to voltage drop of the high voltage source. In addition, by correcting the injection pulse width so as to be smaller than the range where the injection pulse width is large in the range where the injection pulse width is small, it is possible to provide a drive device capable of reducing the controllable minimum injection amount.

The problems, configurations, and effects other than those described above will be clarified from the description of the embodiments below.

DESCRIPTION OF EMBODIMENTS

Embodiments of the present invention will be described below with reference to the drawings.

First Embodiment

Hereinafter, a fuel injection system including a fuel injection device, a pressure sensor, and a drive device according to the present invention will be described with reference to FIGS. 1 to 7.

Figure 1:
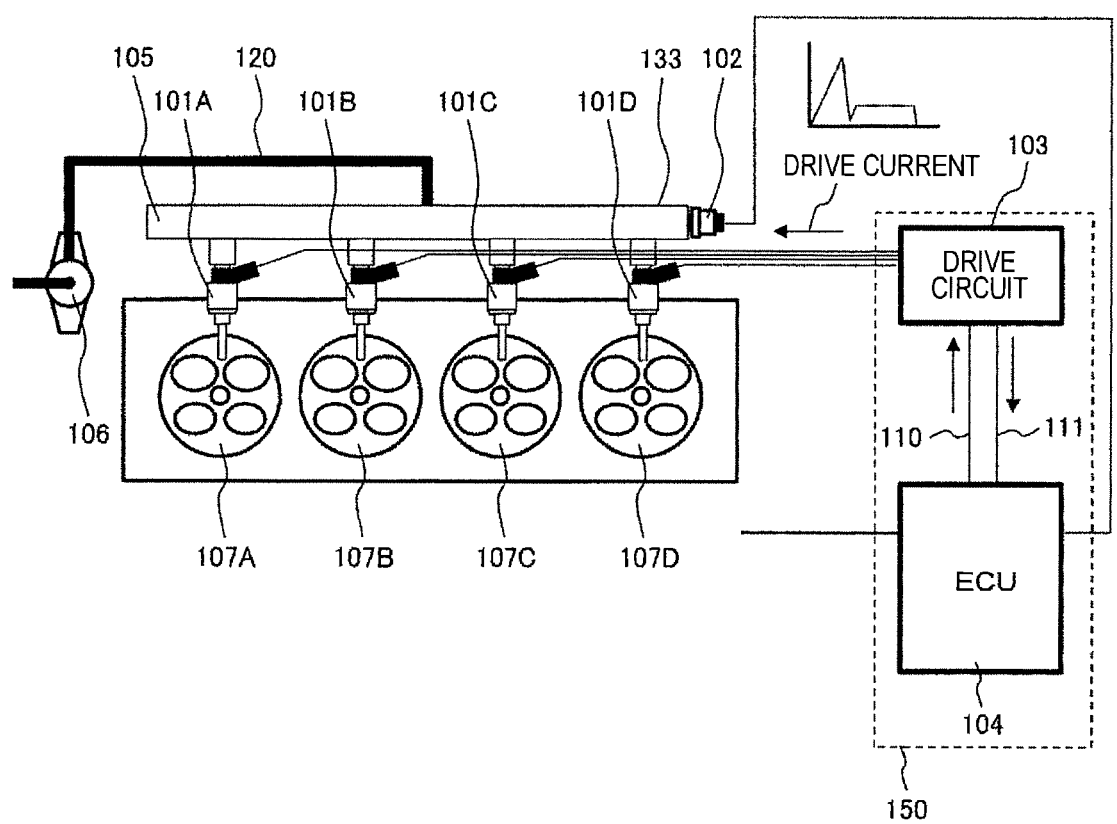
FIG. 1 is a schematic diagram showing a configuration of a fuel injection system in a case where a fuel injection device, a pressure sensor, a drive device, and an engine control unit (ECU) according to a first embodiment of the present invention are mounted in an in-cylinder direct injection type engine.

First, the configuration of the fuel injection system will be described with reference to FIG. 1. FIG. 1 is a schematic diagram showing a configuration of a fuel injection system in a case where a fuel injection device, a pressure sensor, a drive device, and an engine control unit (ECU) according to a first embodiment of the present invention are mounted in an in-cylinder direct injection type engine. The configuration of FIG. 1 is also applied to a second embodiment.

The fuel injection system of the present embodiment includes fuel injection devices 101A to 101D, a fuel rail 105, a pressure sensor 102, a fuel pump 106, a fuel pipe 120, a drive device 150, an ECU, and the like.

The fuel injection devices 101A to 101D are installed in each cylinder so that fuel spray from an injection hole is directly injected into combustion chambers 107A to 107D. The fuel is boosted by the fuel pump 106, sent to the fuel rail 105, and delivered to the fuel injection devices 101A to 101D. Fuel pressure varies due to the flow rate of the fuel discharged by the fuel pump 106, and the balance of the injection amount of the fuel injected into the respective combustion chambers 107A to 107D by the fuel injection devices 101A to 101D provided in each cylinder of the engine; however, the fuel pressure is controlled such that a discharge amount from the fuel pump 106 is controlled with a predetermined pressure as a target value based on information from the pressure sensor 102 provided on the fuel rail 105. The number of cylinders and the number of the fuel injection devices 101A to 101D are not limited to the number of the present embodiment.

The fuel injection from the fuel injection devices 101A to 101D is controlled by the injection pulse width sent from the ECU 104, this injection pulse is input to the drive circuit 103 of the fuel injection devices 101A to 101D, and the drive circuit 103 determines a drive current waveform based on a command from the ECU 104 and supplies the drive current waveform to the fuel injectors 101A to 101D for a time based on the injection pulse. Note that the drive circuit 103 may be mounted as a component integrated with the ECU 104 or a board. The drive circuit 103 and the ECU 104 are collectively referred to as a drive device 150.

The drive circuit 103 is provided in each of the fuel injection devices 101A to 101D. As will be described later, a boosting circuit 514 (see FIG. 5) in the drive circuit 103 may be shared by a plurality of fuel injection devices. The drive circuit 103 provided for each of the fuel injection devices 101A to 101D may be provided dispersedly on a plurality of substrates, or may be provided together on one substrate. Alternatively, the drive circuit 103 dispersedly provided on a plurality of substrates may be housed in one case. Hereinafter, the drive circuit 103 of each fuel injection device 101A to 101D will be described without distinction.

Figure 2:
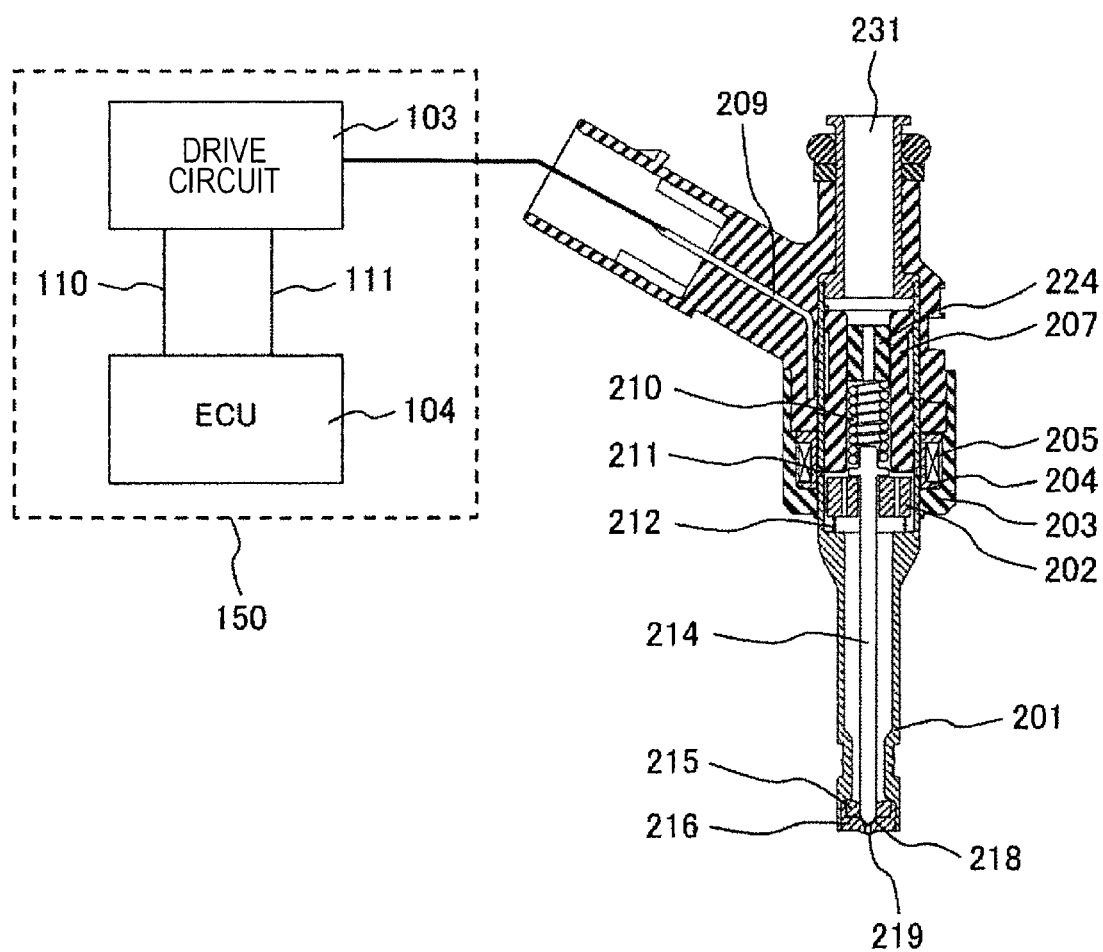
FIG. 2 is a longitudinal sectional view of the fuel injection device according to the first embodiment of the present invention and an example of a configuration of a drive circuit and an ECU for driving the fuel injection device.

Next, with reference to FIG. 2, a configuration and basic operation of the fuel injection devices 101A to 101D and the drive device 150 thereof will be described. FIG. 2 is a longitudinal sectional view of the fuel injection devices 101A to 101D according to the present embodiment and an example of a configuration of the drive circuit 103 and the ECU 104 for driving the fuel injection devices 101A to 101D. In FIG. 2, the same symbols are used for components equivalent to those in FIG. 1.

The ECU 104 takes in a signal indicating the state of the engine from various sensors, and calculates the width of the injection pulse and the injection timing for controlling the injection amount of the fuel injected from the fuel injection devices 101A to 101D in accordance with the operating condition of the internal combustion engine. In addition, the ECU 104 is provided with an A/D converter and an I/O port for taking in signals from various sensors. The injection pulse output from the ECU 104 is input to the drive circuit 103 of the fuel injection devices 101A to 101D via the signal line 110. The drive circuit 103 controls the voltage to be applied to the solenoid 205 and supplies a current to the solenoid 205. The ECU 104 communicates with the drive circuit 103 through a communication line 111, can change the drive current generated by the drive circuit 103 according to the pressure of the fuel supplied to the fuel injection devices 101A to 101D and an operating condition and can change the set values of the current and time.

Figure 3:
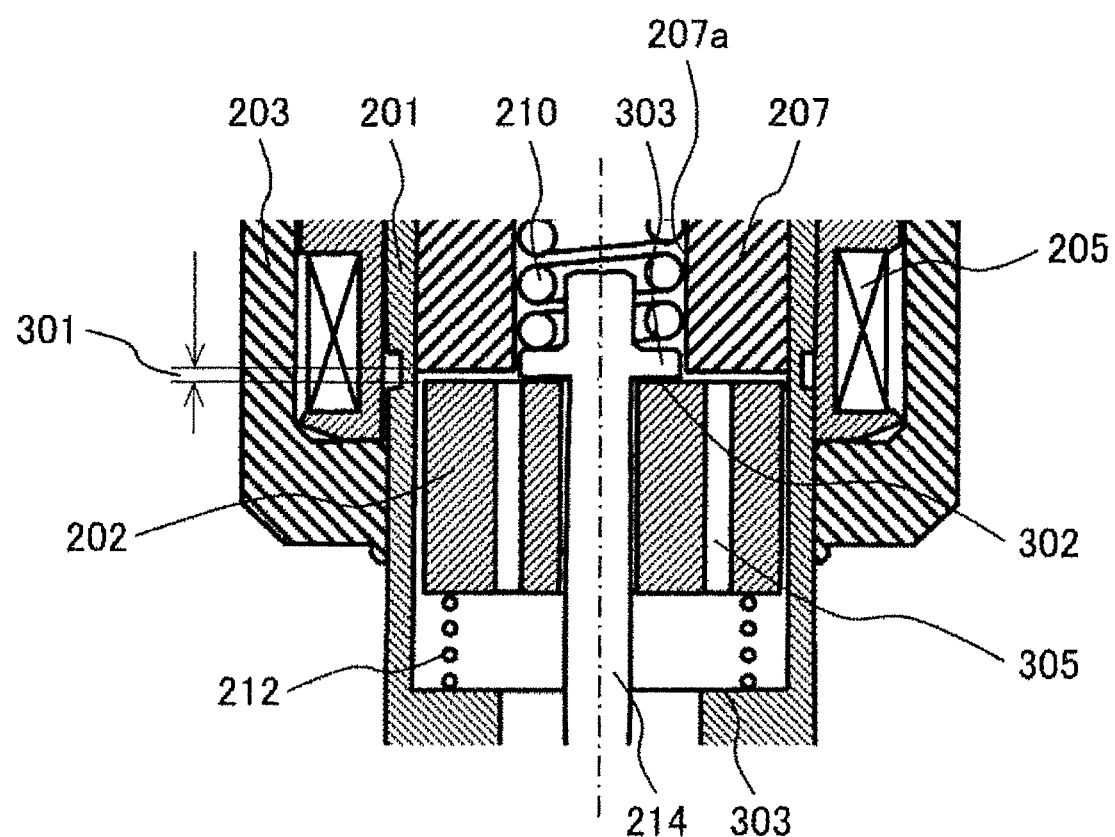
FIG. 3 is an enlarged cross-sectional view showing a cross section of a drive portion of the fuel injection device according to the first embodiment of the present invention in an enlarged manner.

Next, a configuration and operation of the fuel injection devices 101A to 101D will be described with reference to FIGS. 2 and 3. FIG. 3 is an enlarged cross-sectional view showing a cross section of a drive portion of the fuel injection devices 101A to 101D according to the first embodiment of the present invention in an enlarged manner. In FIG. 3, the same symbols are used for components equivalent to those in FIG. 2.

The fuel injection devices 101A to 101D shown in FIGS. 2 and 3 are normally closed electromagnetic valves (electromagnetic fuel injection device), and when the solenoid 205 is not energized, a valve body 214 is urged in a valve closing direction by a spring 210 which is a first spring, and the valve body 214 is in close contact with a valve seat 218 and is in the closed state. In the valve closed state, an urging force by a second spring (return spring) 212 acting in the valve opening direction acts on a mover (movable core) 202. At this time, since the force of the spring 210 acting on the valve body 214 is larger than the force of the return spring 212, an end face 302 of the mover 202 contacts the valve body 214, and the mover 202 is stationary. In addition, the valve body 214 and the mover 202 are configured to be displaceable relative to each other, and are enclosed in a nozzle holder 201. Furthermore, the nozzle holder 201 has an end face 303 which is a spring seat of the return spring 212. The force due to the spring 210 is adjusted at the time of assembly by the pushing amount of a spring retainer 224 fixed to the inner diameter of a fixed core 207.

The fixed core 207, the mover 202, the nozzle holder 201, and the housing 203 constitute a magnetic circuit, and the fuel injection devices 101A to 101D have a gap between the mover 202 and the fixed core 207. A magnetic throttling part 211 is formed in a portion corresponding to a gap between the mover 202 of the nozzle holder 201 and the fixed core 207. The solenoid 205 is attached to the outer peripheral side of the nozzle holder 201 in a state of being wound around a bobbin 204. A rod guide 215 is provided so as to be fixed to the nozzle holder 201 in the vicinity of a tip portion of the valve body 214 on the side of the valve seat 218. The valve body 214 is guided by the movement in the valve axial direction by the two sliding parts of the inner peripheral surface of the fixed core 207 of the valve body 214 and the rod guide 215. An orifice cup 216 having the valve seat 218 and a fuel injection hole 219 is fixed to a tip portion of the nozzle holder 201, and seals an internal space (fuel passage) provided between the mover 202 and the valve body 214 from the outside.

The fuel is supplied from the fuel rail 105 provided upstream of the fuel injectors 101A to 101D to the fuel injection devices 101A to 101D. The fuel supplied to the fuel injection devices 101A to 101D flows to a tip of the valve body 214 through a first fuel passage hole 231. While the valve body 214 maintains the closed state, the fuel is sealed by the seat portion formed at the end portion of the valve body 214 facing the valve seat 218 and the valve seat 218. When the valve body opens, a differential pressure is generated between the upper portion and the lower portion of the valve body 214 by the fuel pressure. This differential pressure is obtained by multiplying the fuel pressure and a pressure receiving area of a contact diameter (hereinafter referred to as a seat diameter) between the valve body 214 and the valve seat 218. Due to the differential pressure and the load of the spring 210, the valve body 114 is pushed in the valve closing direction. When a current is supplied from the drive circuit 103 to the solenoid 205 through a wiring member 209 in the valve closed state, a magnetic field is generated in the magnetic circuit. Then, a magnetic flux passes between the fixed core 207 and the mover 202, and a magnetic attraction force acts on the mover 202. At a timing when the magnetic attraction force acting on the mover 202 exceeds the differential pressure and the load by the set spring 210, the mover 202 starts displacement (valve opening operation) toward the fixed core 207. At this time, the end face 302 of the mover 202 abuts against a position regulating portion (flange portion) 303 of the valve body 214, and the mover 202 and the valve body 214 are integrally displaced.

After the valve body 214 starts the valve opening operation, the mover 202 moves to the position of the fixed core 207, and the mover 202 collides with the fixed core 207. After the mover 202 collides with the fixed core 207, the mover 202 performs an action of receiving a reaction force from the fixed core 207 and bouncing back; however, the mover 202 is attracted to the fixed core 207 by the magnetic attraction force acting on the mover 202, and then stops. At this time, since a force acts on the mover 202 in the direction of the fixed core 207 by the return spring 212, it is possible to shorten the time until convergence of the rebound. Small rebounding action shortens the time during which a gap between the mover 202 and the fixed core 207 becomes large; therefore, stable operation can be performed even for a smaller injection pulse width. During the rebounding action of the mover 202, the mover 202 is displaced away from the position regulating portion 303 of the valve body 214.

The mover 202 and the valve body 214 which have completed the valve opening operation in this manner are stationary in the valve open state. In the valve open state, a gap is formed between the valve body 202 and the valve seat 218, and fuel is injected from the injection hole 219. The fuel passes through a center hole 207a provided in the fixed core 207 and a lower fuel passage hole 305 provided in the mover 202 and flows in the downstream direction. In this valve open state, the end face 302 of the mover 202 is in contact with the position regulating portion (flange portion) 303 of the valve body 214.

When the energization to the solenoid 205 is interrupted, the magnetic flux that has been generated in the magnetic circuit disappears and the magnetic attraction force also disappears. As the magnetic attraction force acting on the mover 202 disappears, so that the mover 202 and the valve body 214 are pushed back to a valve closing position where the mover 202 and the valve body 214 contact the valve seat 218 by the load of the spring 210 and the differential pressure. In this valve closing operation, the end face 302 of the mover 202 abuts against the position regulating portion (flange portion) 303 of the valve body 214, and the mover 202 and the valve body 214 are integrally displaced.

Furthermore, when the valve body 214 is closed from the valve open state, after the valve body 214 comes into contact with the valve seat 218, the mover 202 separates from the position regulating portion (flange portion) 303 of the valve body 214 and continues displacement in the valve closing direction. After the displacement of the mover 202 in the valve closing direction is continued for a certain period of time, the mover 202 is returned to the initial position of the closed valve state by the return spring 212. At the moment when the valve body 214 is closed, by separating the mover 202 from the valve body 214, the mass of the movable member at the moment when the valve body 214 collides with the valve seat 218 can be reduced by the mass of the mover 202. Therefore, the collision energy when the valve body 214 collides with the valve seat 218 can be reduced, thereby suppressing the bound of the valve body 214 caused by the collision of the valve body 214 against the valve seat 218.

In the fuel injection devices 101A to 101D of the present embodiment, the valve body 214 and the mover 202 generate a relative displacement for a short period of time at the moment when the mover 202 collides with the fixed core 207 at the time of valve opening and at the moment when the valve body 214 collides with the valve seat 218 at the time of valve closing, so that it is possible to suppress the bound of the mover 202 with respect to the fixed core 207 and the bound of the valve body 214 with respect to the valve seat 218.

Figure 4:
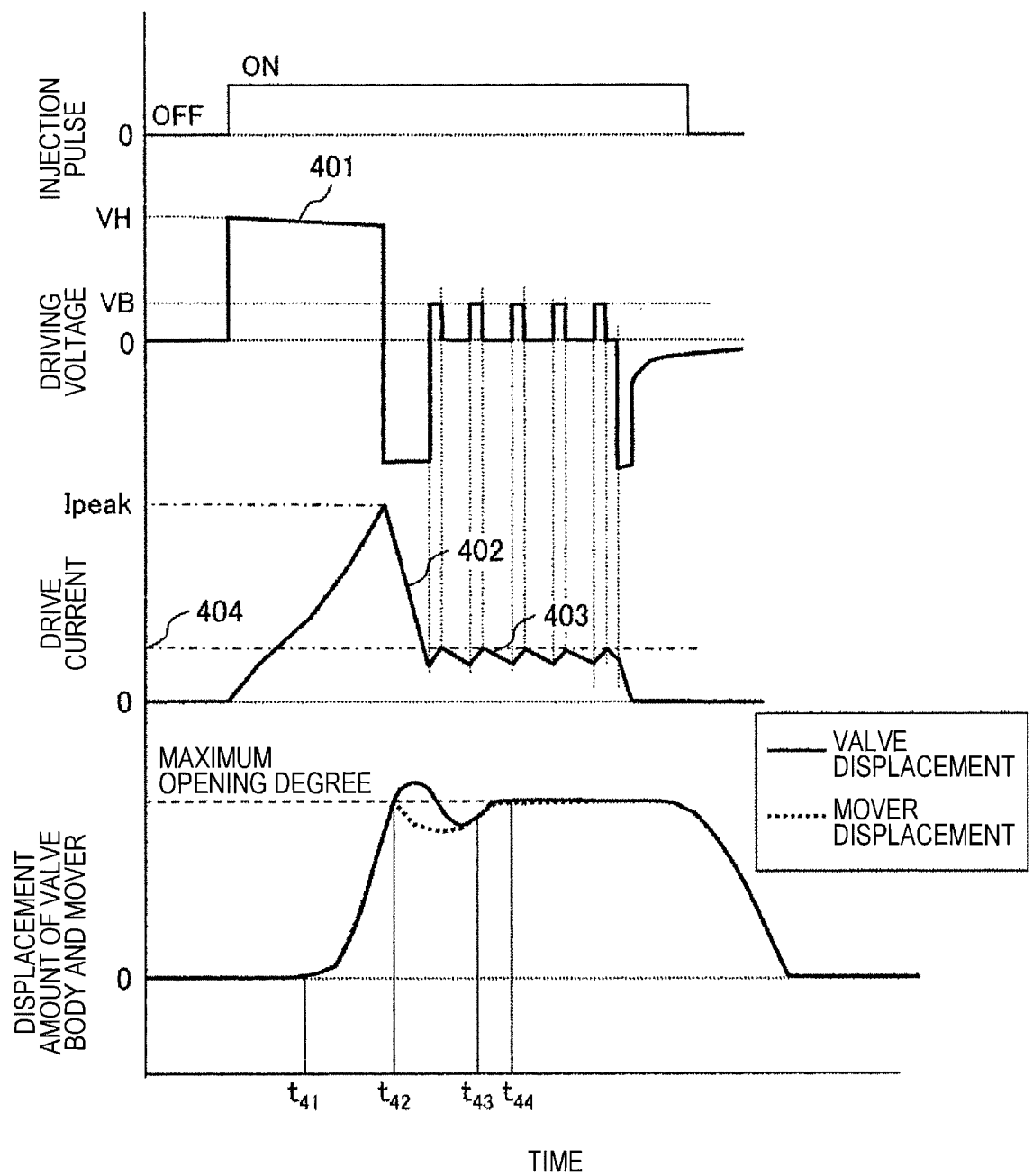
FIG. 4 is a view showing a relationship between time and a general injection pulse, a driving voltage, a drive current that drive the fuel injection device, and a displacement amount of a valve body and a mover.
Figure 5:
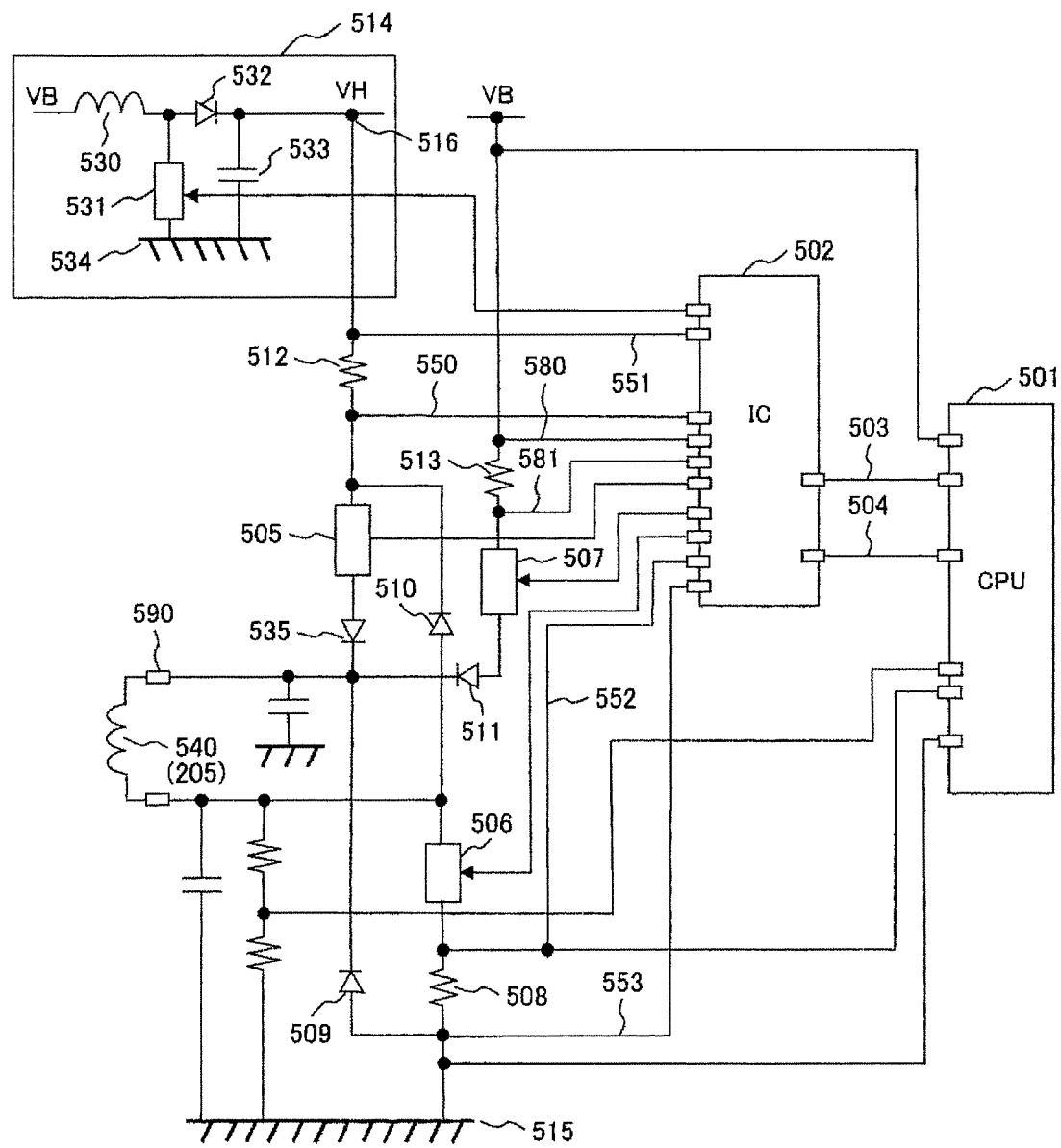
FIG. 5 is a view showing details of a drive device for the fuel injection device according to the first embodiment of the present invention.

Next, the injection pulse output from the ECU 104, the drive voltage at both ends of the terminal of the solenoid 205 of the fuel injection devices 101A to 101D, the drive current (excitation current), the displacement amount of the valve body 214 and the mover 202 (valve body behavior) will be described with reference to FIGS. 4 and 5. FIG. 4 is a view showing a relationship between time and a general injection pulse, a driving voltage, a drive current that drive the fuel injection device, a displacement amount of a valve body, and a displacement of a mover. FIG. 5 is a view showing details of a drive device for the fuel injection device according to the first embodiment of the present invention.

When an injection pulse is input to the drive circuit 103, the drive circuit 103 energizes switching elements 505, 506 to apply a high voltage 401 from a high voltage source boosted to a voltage higher than the battery voltage to the solenoid 205, and starts to supply a current to a solenoid 205. When the current value reaches a peak current value $I_{peak}$ preset in the ECU 104, the application of the high voltage 401 is stopped. Thereafter, when the switching element 505 and the switching element 506 are de-energized, by a counter electromotive force due to the inductance of a fuel injection device 540, a diode 509 and a diode 510 are energized, the current is fed back to a voltage source VH side, and the current supplied to the fuel injection device 540 rapidly decreases from the peak current value $I_{peak}$ as a current 402. When the switching element 506 is turned ON during the transition period from the peak current value $I_{peak}$ to a current 403, a current due to a counter electromotive force energy flows to a ground potential 515 side. A current regenerates in the circuit, a voltage of approximately 0 V is applied to the solenoid 205, and the current gently decreases. When the current value becomes smaller than a predetermined current value 404, the drive circuit 103 supplies a current to the switching element 506, applies a battery voltage VB by energizing and de-energizing a switching element 507, and provides a switching period for performing control so that the predetermined current 403 is maintained. When a fuel pressure supplied to the fuel injection device 540 increases, a fluid force acting on the valve body 214 increases, and the time until the valve body 214 reaches a target opening degree increases. As a result, an arrival timing to the target opening degree may be delayed with respect to an arrival time of the peak current $I_{peak}$; however, when the current is rapidly reduced similar to the current 402, the magnetic attraction force acting on the mover 202 rapidly decreases, so that the behavior of the valve body 214 becomes unstable. In some cases, the valve closing may be started regardless of energization. In the case where the current is gradually decreased by turning ON the switching element 506 during transition of the current 403 from the peak current $I_{peak}$, it is possible to suppress the decrease in the magnetic attraction force, ensure the stability of the valve body 214 at the high fuel pressure, and suppress the variation in the injection amount.

The fuel injection device 540 (101 A to 101 D) is driven by such a supply current profile. During the period from the application of the high voltage 401 to the peak current value $I_{peak}$, the mover 202 and the valve body 214 start to displace at timing $t_{41}$. Thereafter, the mover 202 and the valve body 214 reach the maximum opening degree. At the timing when the mover 202 reaches the maximum opening degree, the mover 202 collides with the fixed core 207, and the mover 202 performs a bound operation with the fixed core 207. Since the valve body 214 is configured to be displaceable relative to the mover 202, the valve body 214 moves away from the mover 202, and the displacement of the valve body 214 overshoots beyond the maximum opening degree. Thereafter, due to the magnetic attraction force generated by the holding current 403 and the force in the valve opening direction of the return spring 212, the mover 202 is stationary at a position of a predetermined maximum opening degree. In addition, the valve body 214 is seated on the mover 202 and is stationary at the position of the maximum opening degree, and is in the valve opening state.

In the case of a fuel injection device having a movable valve in which the valve body 214 and the mover 202 are integrated, the displacement amount of the valve body 214 does not become larger than the maximum opening degree. The amount of displacement of the mover 202 and the valve body 214 after reaching the maximum opening is equal.

Furthermore, with reference to FIG. 5, the configuration of the drive device for the fuel injection device according to the first embodiment of the present invention will be described in detail.

A CPU 501 is incorporated in the ECU 104, for example. The CPU 501 takes in a signal indicating the state of the engine of a pressure sensor 102 attached to the fuel rail 105, an A/F sensor for measuring the amount of air flowing into an engine cylinder, an oxygen sensor for detecting an oxygen concentration of an exhaust gas discharged from the engine cylinder, a crank angle sensor, and the like, and calculates a width Ti (that is, the injection amount) of the injection pulse and the injection timing for controlling the injection amount injected from the fuel injection device 540 (101A to 101D) according to the operating condition of the internal combustion engine. The CPU 501 outputs the injection pulse width Ti to a driving IC 502 of the fuel injection device through the communication line 504. Thereafter, the driving IC 502 is switched the energization and de-energization of the switching elements 505, 506, and 507 and supplies the drive current to the fuel injection device 540.

The switching element 505 is connected between a high voltage source higher than a voltage source VB input to the drive circuit and a high voltage side terminal of the fuel injection device 540. The switching elements 505, 506, and 507 are configured by, for example, FETs, transistors, or the like, and can switch between energization and de-energization of the fuel injection device 540. A boosted voltage VH which is an initial voltage value of the high voltage source is, for example, 60 V, and is generated by boosting the battery voltage by the boosting circuit 514. The boosting circuit 514 includes, for example, a method using a DC/DC converter or the like, and a method using a coil 530, a transistor 531, a diode 532, and a capacitor 533. In the case where the boosting circuit 514 is configured by the latter method, when the transistor 531 is turned ON, the battery voltage VB flows to a ground potential 534 side; however, when the transistor 531 is turned OFF, a high voltage generated in the coil 530 is rectified through the diode 532, and electric charge is accumulated in the capacitor 533. This transistor is repeatedly turned ON and OFF until the boosted voltage VH is reached, and the voltage of the capacitor 533 is increased. The transistor 531 is connected to the IC 502 or the CPU 501, and the boosted voltage VH output from the boosting circuit 514 is detected by the IC 502 or the CPU 501. In the present embodiment, the boosted voltage VH is input to the IC 502 by a wiring 551, and the boosted voltage VH is detected by the IC 502.

Besides, between a power source side terminal 590 of the solenoid 205 and the switching element 505, a diode 535 is provided so that a current flows from the boosting circuit 514 which is a second voltage source toward the solenoid 205 and the contact potential 515. Besides, between a power source side terminal 590 of the solenoid 205 and the switching element 507, a diode 511 is provided so that a current flows from a battery voltage source VB toward the solenoid 205 and the contact potential 515. Since the diode 535 and the diode 511 are provided, while the switching element 506 is energized, a current does not flow from the ground potential 515 toward the solenoid 205, the battery voltage source VB, and the second voltage source 514. In addition, in the ECU 104, a register and a memory are mounted in order to store numerical data necessary for engine control such as calculation of injection pulse width. The register and the memory are included in the drive device 150 or the CPU 501 in the drive device 150.

Furthermore, the switching element 507 is connected between the low voltage source and the high voltage terminal of the fuel injection device. The low voltage source VB is, for example, a battery voltage, and its voltage value is about 12 to 14 V. The switching element 506 is connected between the low voltage side terminal of the fuel injection device 540 and the ground potential 515. The driving IC 502 detects the current value flowing through the fuel injection device 540 by means of the current detection resistors 508, 512, and 513. On the basis of the detected current value, energization and de-energization of the switching elements 505, 506, 507 is switched to generate a desired drive current. Diodes 509 and 510 are provided to apply a reverse voltage to solenoid 205 of the fuel injection device and to rapidly reduce the current being supplied to solenoid 205. The CPU 501 communicates with the driving IC 502 through a communication line 503. On the basis of the pressure of the fuel supplied to the fuel injection device 540 and operating conditions, it is possible to switch the drive current generated by the driving IC 502. Both ends of the resistors 508, 512, and 513 are connected to the A/D conversion port of the IC 502 by wirings 550, 551, 580, 581, 552, and 553, and are configured so that the voltage applied across the resistors 508, 512, and 513 can be detected by the IC 502.

Figure 6:
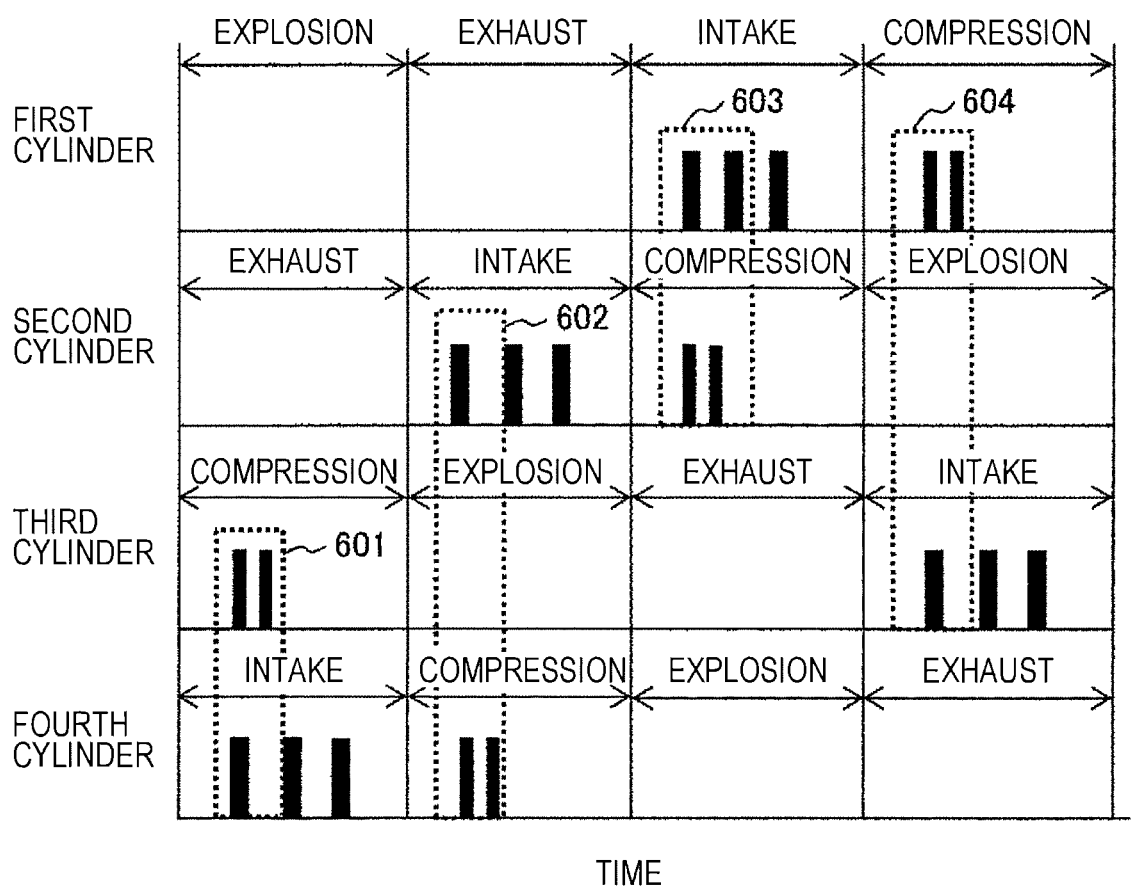
FIG. 6 is a view showing a relationship of a fuel injection timing of each cylinder in a case where multistage fuel injection is performed three times in an intake stroke and twice in a compression stroke during one combustion cycle including the intake stroke, the compression stroke, an expansion stroke, and an exhaust stroke, for the drive device for the fuel injection device according to the first embodiment.
Figure 7:
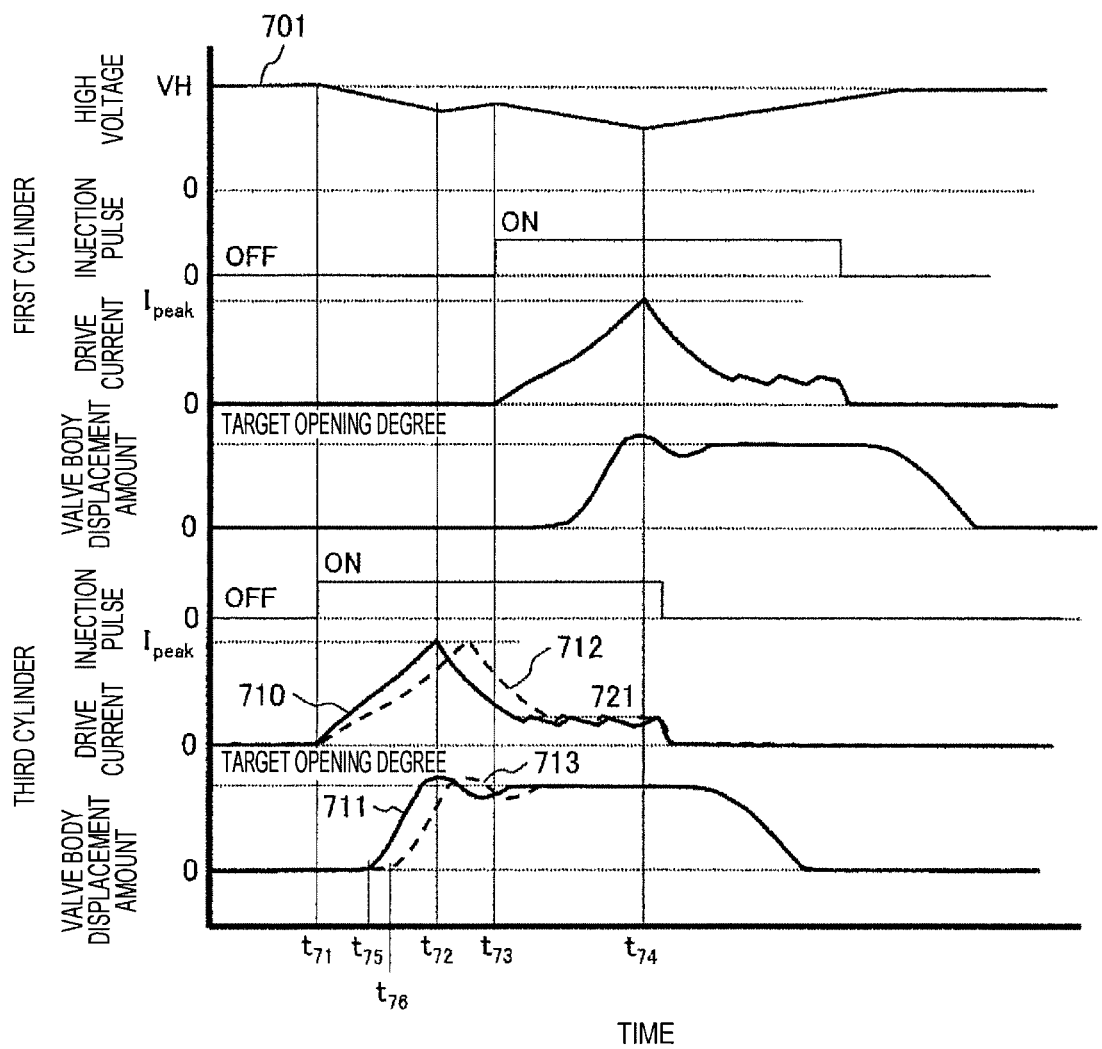
FIG. 7 is a view showing a relationship between time and a voltage value of a high voltage source, an injection pulse, a drive current, and a valve body displacement amount body in the period of 604 in FIG. 6, for a first cylinder and a third cylinder.
Figure 8:
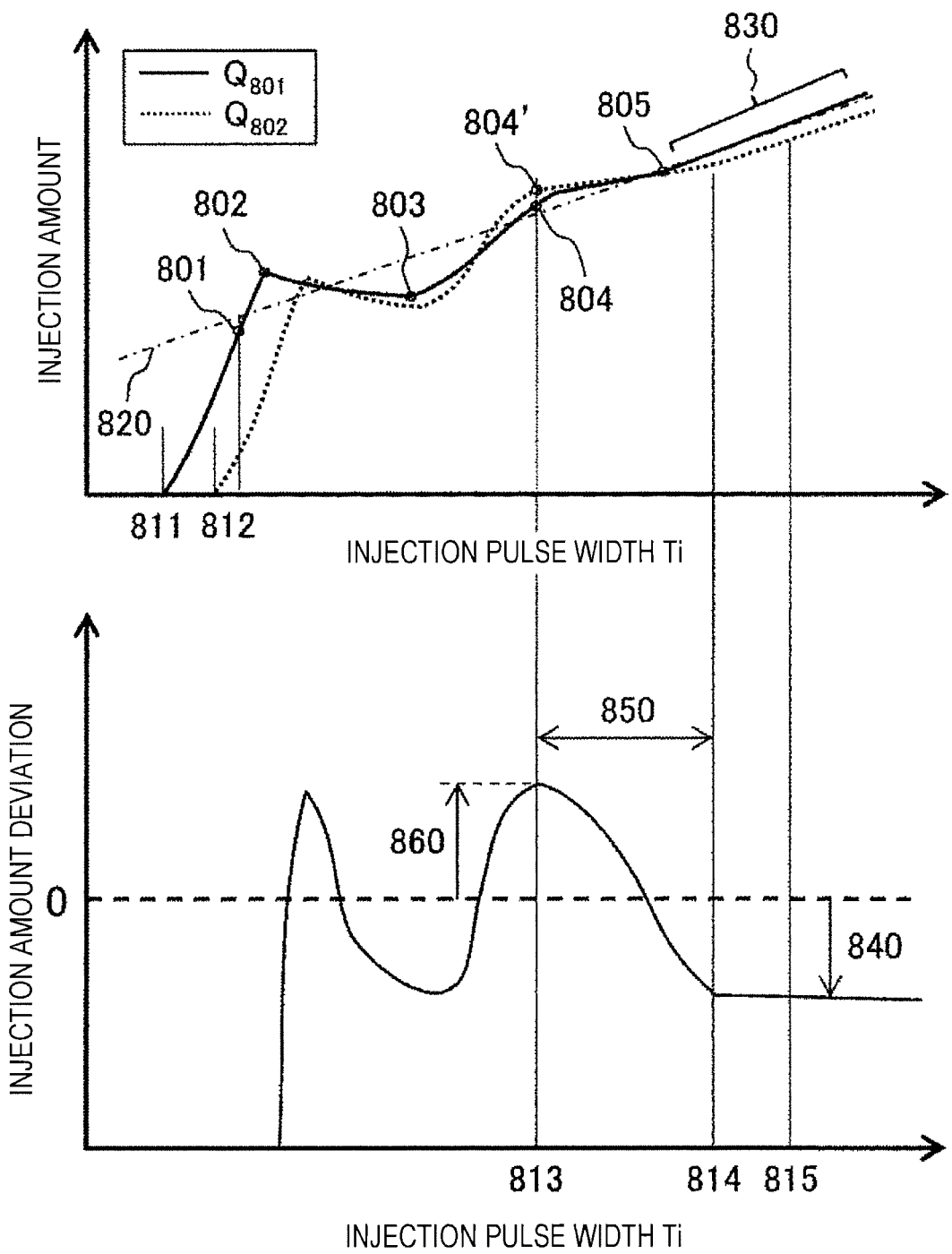
FIG. 8 is a view showing a relationship between an injection pulse width and a fuel injection amount and a relationship between an injection pulse width and an injection amount deviation in a case where the voltage value of the high voltage source does not decrease ($Q_{801}$) and the case where the voltage value decreases ($Q_{802}$).
Figure 9:
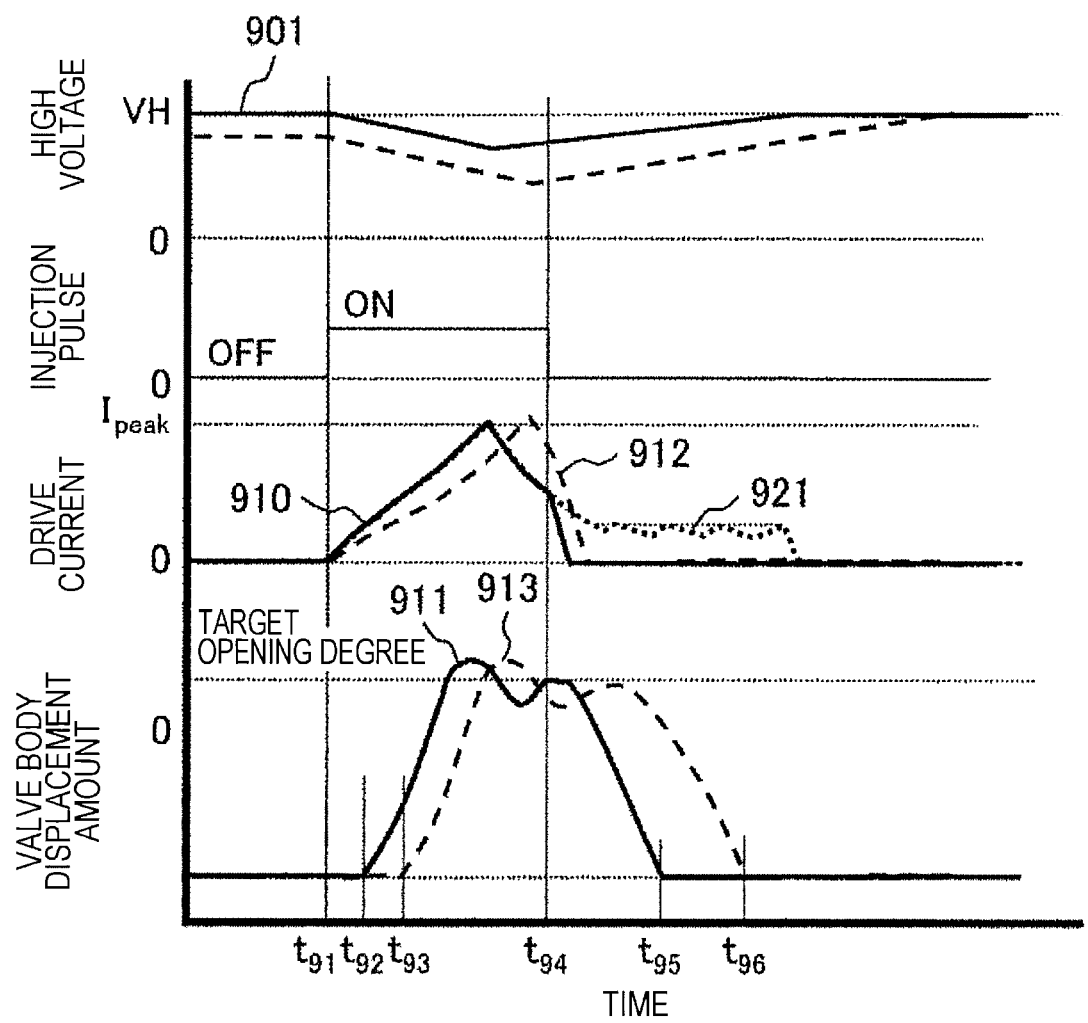
FIG. 9 is a view showing a relationship between time and a voltage value of a high voltage source, an injection pulse, a drive current, and a valve body displacement amount under a condition that the injection pulse is small (a condition that an injection pulse width Ti is 804 in FIG. 8).
Figure 10:
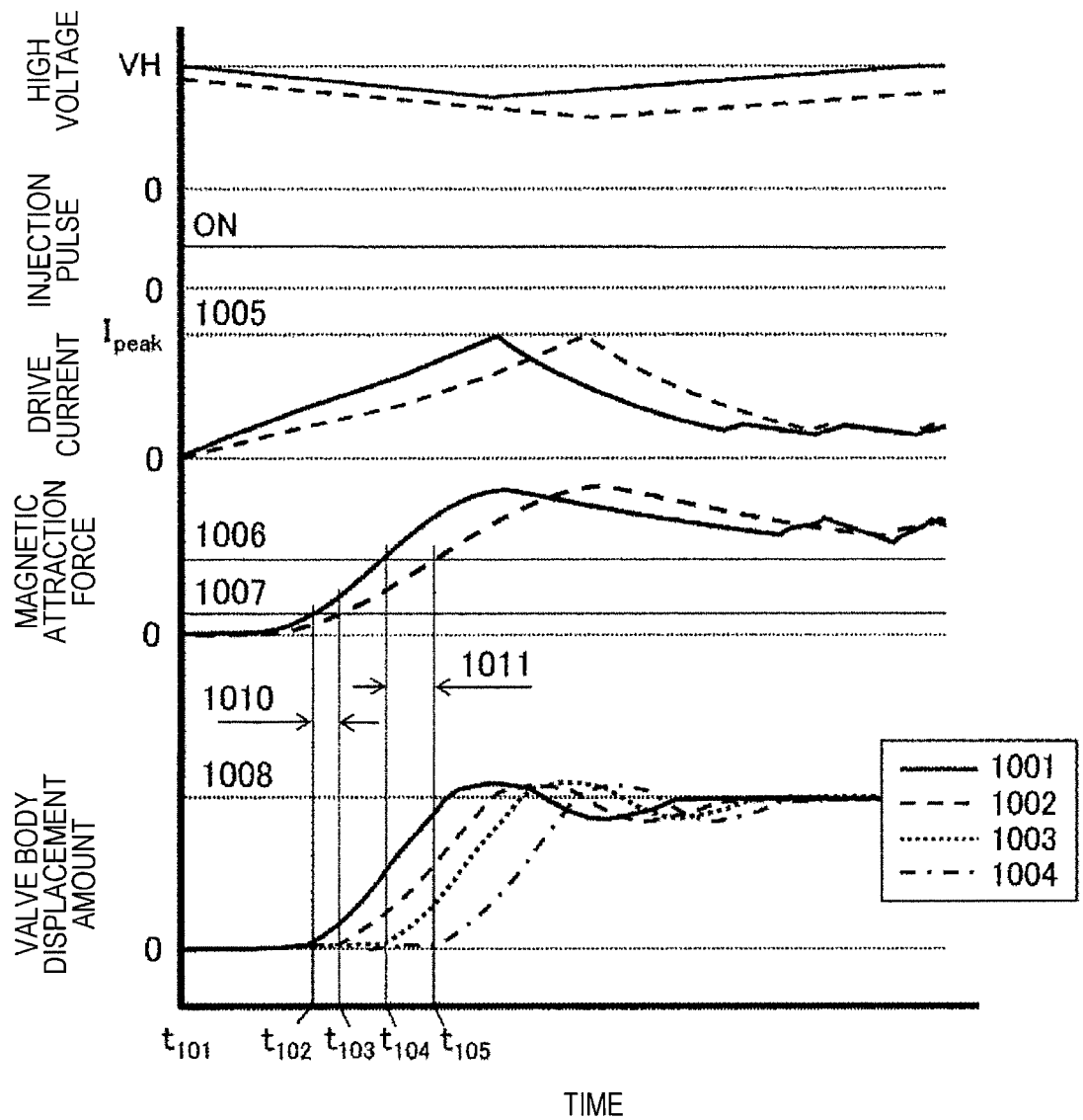
FIG. 10 is a view showing a relationship between time and a voltage of a high voltage source, an injection pulse, a drive current, a magnetic attraction force acting on a mover, and a valve body displacement amount under a condition that the voltage value of the high voltage source does not decrease and a condition that the voltage decreases.
Figure 11:
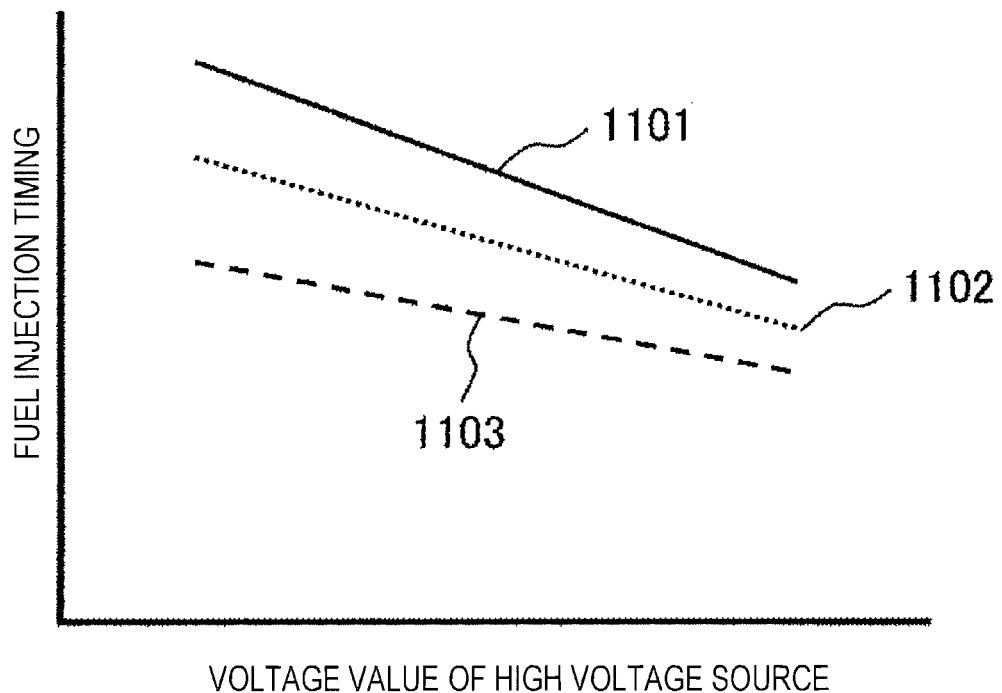
FIG. 11 is a view showing a relationship between a boosted voltage and fuel injection timing under three conditions in which fuel pressure supplied to a fuel injection device is different, for the drive device for the fuel injection device according to the first embodiment.

Next, with reference to FIGS. 6, 7, 8 and 9, a method of correcting the injection amount in the first embodiment will be described. FIG. 6 is a view showing a relationship of a fuel injection timing of each cylinder in a case where multistage fuel injection is performed three times in an intake stroke and twice in a compression stroke during one combustion cycle including the intake stroke, the compression stroke, an expansion stroke, and an exhaust stroke, for the drive device for the fuel injection device according to the first embodiment. FIG. 7 is a view showing a relationship between time and a voltage value of a high voltage source, an injection pulse, a drive current, and a valve body displacement amount in the period of 604 in FIG. 6, for a first cylinder and a third cylinder. FIG. 8 is a view showing a relationship between an injection pulse width and a fuel injection amount and a relationship between an injection pulse width and an injection amount deviation in a case where the voltage value of the high voltage source does not decrease ($Q_{801}$) and the case where the voltage value of the high voltage source decreases ($Q_{802}$). FIG. 9 is a view showing a relationship between time and a voltage value of a high voltage source, an injection pulse, a drive current, and a valve body displacement amount under a condition that the injection pulse is small (a condition that an injection pulse width Ti is 804 in FIG. 8). FIG. 10 is a view showing a relationship between time and a voltage of a high voltage source, an injection pulse, a drive current, a magnetic attraction force acting on a mover 202, and a valve body displacement amount under a condition that the voltage value of the high voltage source does not decrease and a condition that the voltage decreases. FIG. 11 is a view showing a relationship between a boosted voltage and fuel injection timing under three conditions in which fuel pressure supplied to a fuel injection device is different, for the drive device for the fuel injection device according to the first embodiment.

A method of correcting the injection amount will be described with reference to FIGS. 6, 7, and 8. First, a condition under which the injection timing overlaps among the cylinders will be described. In a direct injection engine, after injecting fuel in the intake stroke to form a homogeneous air-fuel mixture in the cylinder, by injecting fuel in the compression stroke and forming a locally rich mixture near the spark plug, there is a case where combustion control is performed to achieve exhaust purification by PN suppression and improvement in fuel efficiency by performing weak stratified combustion.

In this case, as shown in FIG. 6, the injection timing (injection period) between the cylinders may overlap in some cases. FIG. 6 shows, when it is defined as the first, second, third and fourth cylinders from the preceding cylinder, a case of a general in-line four-cylinder engine igniting in order of the first cylinder, the third cylinder, the fourth cylinder, and the second cylinder. In the period of 601, the injection in the compression stroke in the third cylinder and the injection in the intake stroke in the fourth cylinder overlap. In the period of 602, the injection in the intake stroke in the second cylinder and the injection in the compression stroke in the fourth cylinder overlap. In the period 603, the injection in the intake stroke in the first cylinder and the injection in the compression stroke in the second cylinder overlap. In the period of 604, the injection in the compression stroke in the first cylinder and the injection in the intake stroke in the third cylinder overlap.

In the case where one boosting circuit 514 is arranged for each cylinder, if the injection interval within the first cylinder is secured, when the fuel injection in the intake stroke and the compression stroke overlaps among the cylinders, there is little possibility that the next re-injection is required in a state in which a voltage value of the high voltage source decreases. However, since the charge accumulated in the capacitor 533 of the boosting circuit 514 is discharged after a lapse of a certain period of time, when the driving cycle of the boosting circuit 514 is delayed, the voltage value of the high voltage source may slightly decrease. Furthermore, in order to reduce heat generation and cost of the ECU 104, in a four-cylinder engine, there are cases where one boosting circuit 514 is provided for each of the odd-numbered cylinders 1, 3 and the even-numbered cylinders 2, 4, or one boosting circuit 514 is shared by the four cylinders. By reducing the number of boosting circuits 514, the number of switching elements including a transistor or the like securing withstand voltage and the number of capacitors capable of storing high voltage can be reduced, thereby reducing the cost of the drive circuit 103.

In addition, in the boosting circuit 514, in order to store the electric charge in the capacitor 533, the switching element 531 is controlled to repeat ON/OFF at high frequency. In this case, the boosting circuit 514 generates heat, so that the time of applying a high voltage to the solenoid 202 or the current value that can be passed through the solenoid 202 may be restricted. By reducing the number of the boosting circuits 514, heat generation of the drive circuit 103 can be suppressed. Especially, even when the fuel pressure supplied to the fuel injection device 540 becomes high, current control of the fuel injection device 540 can be performed without being restricted by current. As a result, it is possible to stably operate the fuel injection device 540 with a high fuel pressure, and it is possible to improve the accuracy of the injection amount in the high fuel pressure range.

FIG. 7 shows, as an example, a condition (case) in which multistage injection is performed with a configuration in which one boosting circuit 514 is provided for each of the first and third odd-numbered cylinders and the second and fourth even-numbered cylinders. Although FIG. 7 shows the first and third odd-number cylinders, the second and fourth even-numbered cylinders are also the same as in FIG. 7. In FIG. 7, the drive current of the preceding cylinder (first cylinder) and the valve body displacement amount in the case where the timing when the injection pulse is turned ON is matched with the timing when the injection pulse of the third cylinder is turned ON are indicated by broken lines 712 and 713.

At a time before the timing $t_{71}$ at which the injection pulse of the third cylinder is turned ON, the voltage value of the high voltage source (boosting circuit) 514 is controlled to be the boosted voltage VH. At a timing $t_{71}$ at which the injection pulse of the third cylinder is turned ON, a voltage is applied to the solenoid 205 from the high voltage source 514, and the electric charge stored in the capacitor 533 decreases, so that the voltage value of the high voltage source 514 decreases. At a timing $t_{72}$ at which the current reaches the peak current $I_{peak}$ the application of the voltage from the high voltage source 514 to the solenoid 205 is stopped and the battery voltage source VB or 0 V is applied to the solenoid 205. After a timing $t_{72}$, the voltage value of the high voltage source 514 returns toward the boosted voltage VH; however, before returning to the boosted voltage VH, the injection pulse in the compression stroke in the first cylinder is energized at timing $t_{73}$, and the voltage value of the high voltage source 514 decreases. Thereafter, when the timing reaches the timing $t_{74}$ at which the current value of the first cylinder becomes the peak current $I_{peak}$ the voltage application from the high voltage source 514 to the solenoid 205 is stopped; therefore, the current value returns to the boosted voltage value VH after a certain period of time has elapsed.

When the drive current 712 and the valve body displacement amount 713 of the first cylinder when the timing when the injection pulse is turned ON is matched with the timing when the injection pulse of the third cylinder is turned ON are compared with a drive current 710 of the third cylinder and a valve body displacement amount 711, since the voltage value applied to the solenoid 205 is lower in the first cylinder than in the third cylinder, the current flowing in the solenoid 205 decreases and the rise of the current is delayed. As a result, the rise of the magnetic attraction force generated in the mover 202 is also delayed. Therefore, the timing when the magnetic attraction force exceeds the force in the valve closing direction acting on the valve body 214 and the mover 202 is delayed, so that the valve opening start timing of the valve body 214 is delayed from the timing $t_{75}$ to the timing $t_{76}$. Since the voltage value of the high voltage source does not affect the current after the current value flowing through the solenoid 205 reaches the holding current 721, the delay time from when the injection pulse is turned OFF to when the valve body 214 closes becomes equal between the first cylinder and the third cylinder.

Therefore, when comparing the injection amounts of the first cylinder and the third cylinder, a valve opening delay time of the first cylinder until the valve body 214 reaches the target opening degree after the injection pulse is turned ON becomes longer, and the injection amount decreases. When the voltage of the high voltage source 514 is lower than the boosted voltage VH at the timing when the injection pulse is turned ON, the injection pulse width is corrected so as to be longer than the injection pulse width in the case where the voltage does not decrease, so that the injection amount is increased. This makes it possible to suppress variation in the injection amount between the cylinders between the first cylinder and the third cylinder.

This means that in the case of setting the pulse width of the injection pulse to the energization time (for example, the injection pulse width 815 in FIG. 8) that is closed after the drive current is switched to the holding current, the pulse width of the injection pulse in the case where the fuel injection timing or the fuel injection period overlaps between the cylinders is corrected so as to be longer than the pulse width of the injection pulse in the case where the injection timing or the injection period does not overlap. Alternatively, this means that in the case of setting the pulse width of the injection pulse to the energization time (for example, the injection pulse width 815 in FIG. 8) at which the valve body is closed after the drive current is switched to the holding current, the pulse width of the injection pulse in the case where the voltage of the high voltage source 514 decreases is corrected so as to be longer than the pulse width of the injection pulse in the case where the voltage of the high voltage source does not decrease.

Since the amount of decrease in the injection amount depends on the voltage value of the high voltage source 514, it is preferable to determine the correction amount of the injection pulse according to the voltage value of the high voltage source 514. Further, by connecting a contact 516 to the IC 502 or an A/D conversion port of the CPU 501, voltage detection means for detecting the voltage value of the high voltage source, which is the output of the boosting circuit 514, may be provided. In the present embodiment, the contact 516 is connected to the A/D conversion port of the IC 502 via the wiring 551. The relationship between the injection amount, the voltage value of the high voltage source 514, and the injection pulse width is preferably given to the CPU 501 in advance. With such a configuration, it is possible to determine an appropriate injection pulse width Ti from the required injection amount calculated by the CPU 501 and the detected voltage value of the high voltage source 514.

FIG. 7 shows a case where the pulse width Ti of the injection pulse is sufficiently long. This corresponds to the case where the injection pulse width Ti shown in FIG. 8 is longer than the pulse width at 814, and corresponds to a section indicated by the injection amount characteristic 830.

Next, the relationship (flow rate characteristic) between the injection pulse width Ti and the injection amount will be described with reference to FIG. 8.

First, a general flow rate characteristic will be described using the flow rate characteristic $Q_{801}$ in the case where the voltage of the high voltage source 514 does not decrease. When the injection pulse width Ti does not reach the fixed time and becomes smaller than 811, since the magnetic attraction force acting on the mover 202 does not exceed the force in the valve closing direction acting on the valve body 214, the valve body 214 does not start opening and fuel is not injected. The force in the valve closing direction is the resultant force of the force of the spring 210 acting on the valve body 214 and the force due to the differential pressure of the fuel pressure acting on the valve body 214 in the closed state described above.

Under a condition that the injection pulse width Ti is short, for example, 801, the valve body 214 separates from the valve seat 218 and starts to displace; however, since the valve closing starts before the valve body 214 reaches the target opening degree, the injection amount decreases with respect to a one-dot chain line 820 extrapolated from a linear region 830 in which the relationship between the injection pulse width and the injection amount becomes linear.

With the pulse width at the point 802, valve closing starts immediately after reaching the target opening degree, and the locus of the valve body 214 becomes parabolic motion. Under this condition, the kinetic energy of the valve body 214 in the valve opening direction is large and the magnetic attraction force acting on the mover 202 is large, so that the proportion of the time required for closing the valve body 214 increases, so that the injection amount increases with respect to the one-dot chain line 820.

With the injection pulse width at a point 803, the valve body 214 starts to close at the timing when the bound amount of the valve body 214 caused by collision of the mover 202 with the fixed core 207 at the timing when the valve body 214 reaches the target opening degree is the maximum. Therefore, a repulsive force when the mover 202 and the fixed core 207 collide with each other acts on the mover 202, the valve closing delay time from when the injection pulse is turned OFF until when the valve body 214 closes becomes small. As a result, the injection amount decreases with respect to the one-dot chain line 820.

At a point 804, since the injection pulse is stopped before the current supplied to the solenoid 205 reaches the holding current, the valve closing delay time becomes longer, and the injection amount increases with respect to the one-dot chain line 820. Further, when the mover 202 reaches the target opening degree and collides with the fixed core 207, and rebounds and then collides with the fixed core 207 again in the direction of the fixed core 207, the valve opening delay time increases due to the kinetic energy of the mover 202. Therefore, even after the current supplied to the solenoid 205 reaches the holding current, the injection amount at the point 804 may become larger than the one-dot chain line 820 in some cases.

Furthermore, at the injection pulse width Ti which is larger than a point 805 at which the bound of the valve body 214 converges and the current reaches the holding current, the fuel injection amount linearly increases in accordance with the increase in the injection pulse width Ti.

In the region from the start of fuel injection to the pulse width Ti indicated by the point 804, even if the valve body 214 does not reach the target opening degree or the valve body 214 reaches the target opening degree, the bound of the valve body 214 is not stabilized, so that the injection amount varies. In order to reduce the controllable minimum injection amount, it is necessary to increase the region in which the fuel injection amount increases linearly as the injection pulse width Ti increases, or it is necessary to correct the injection amount of the nonlinear region in which the relationship between the injection pulse width Ti and the injection amount is not linear and the injection pulse width Ti is shorter than the pulse width at 805.

In the flow rate characteristic $Q_{802}$ when the voltage of the high voltage source 514 decreases, because the valve opening start timing of the valve body 214 is delayed for the reason explained in FIG. 7, the fuel injection timing is delayed from 811 to 812. In the case of the injection pulse width 815, when the voltage decreases as compared with the case where the voltage of the high voltage source 514 does not decrease, the valve opening delay becomes longer, so that the injection amount becomes smaller as indicated by 840. The relationship between the drive current and the displacement amount of the valve body 214 under this condition is as described in 710, 711, 712, and 713 in FIG. 7.

Also, in 804' where the injection pulse width is smaller than the linear region 830, there is a case where the injection amount becomes larger in the case where the voltage is lower than when the voltage of the high voltage source 514 does not decrease. At a point 804', the displacement amount of the valve body 214 until the valve body 214 reaches the target opening degree is equivalent to the point 805. In the case where the valve closing delay time is the same between the condition where the voltage of the high voltage source 514 does not decrease and the condition where the voltage of the high voltage source 514 decreases, the injection amount becomes smaller in the case where the voltage of the high voltage source 514 is lower than when where the voltage does not decrease. However, when comparing the amount of displacement of the valve body 214 after stopping the injection pulse, if the voltage of the high voltage source 514 decreases, the valve closing delay time becomes longer and the area of the displacement amount of the valve body 214 becomes larger. As a result, the injection amount is determined by the area of the displacement amount of the valve body 214; therefore, in the case where the voltage of the high voltage source 514 is lower than when it is not decreased, the injection amount increases.

With reference to FIG. 9, the fuel injection amount at point 804' will be described. In FIG. 9, a drive current when the voltage value of the high voltage source 514 does not decrease is indicated by 910, a displacement amount of the valve body is indicated by 911, a drive current when the voltage of the high voltage source 514 decreases is indicated by 912, and a valve body displacement amount is indicated by 913. In FIG. 7, the case where the pulse width Ti of the injection pulse is shorter than that in the case of FIG. 7 is shown. This corresponds to the case where the injection pulse width Ti shown in FIG. 8 is the pulse width at 813. A waveform denoted by reference numeral 921 in FIG. 9 is a holding current supplied from the battery power source VB when the injection pulse width Ti is assumed to be the same length as in FIG. 7.

As a first factor causing an increase in the injection amount, the time it takes for the drive current to reach the peak current value $I_{Peak}$ is delayed when the voltage of the high voltage source 514 is lower than when the voltage of the high voltage source 514 does not decrease. As a result of this delay, as shown in FIG. 9, the drive current value at a timing $t_{94}$ at which the injection pulse is turned OFF increases. As the drive current value increases, the magnetic attraction force increases and the valve closing delay time increases.

Even after the injection pulse is turned OFF, because of the influence of the eddy current, a residual magnetic flux is generated in the magnetic member of the mover 202, the fixed core 207, and the housing 203 constituting the magnetic circuit, and the magnetic attraction force remains. The residual magnetic attraction force increases as the drive current increases at the timing $t_{94}$ at which the injection pulse is turned OFF. As the residual magnetic attraction force increases, the force acting on the mover 202 in the valve opening direction increases, and the valve closing delay time increases.

The second reason for the increase in the injection amount is the bound of the valve body 214 that occurs after the mover 202 reaches the target opening degree. In the case where the voltage of the high voltage source 514 does not decrease, after the bound of the valve body 214 caused by the bound between the mover 202 and the fixed core 207 after the valve body 214 reaches the target opening degree converges, the valve body 214 starts to close from the target opening degree. On the other hand, in the case where the voltage of the high voltage source 514 decreases, the bound that occurs after the valve body 214 reaches the target opening degree does not converge and the valve closing operation is started while the mover 202 is moving in the direction of the target opening degree. Therefore, the valve closing delay time increases due to the kinetic energy of the mover 202.

The injection amount is determined by a tradeoff between the valve opening delay time and the valve closing delay time. In the case where the voltage is lower than when the voltage of the high voltage source 514 does not decrease, the injection amount until the injection pulse is turned OFF becomes small and the injection amount from the turning off of the injection pulse to the completion of closing of the valve body 214 becomes large. As a result, with the injection pulse width 815, as compared with the injection pulse width 815 of a linear region (linear region) 830, there is a case that the injection amount becomes larger in the case where the deviation of the injection amount changes in a positive direction or the voltage is lower than when the voltage of the high voltage source 514 does not decrease.

In the linear region 830, in the case where the voltage of the high voltage source 514 is lower than when the voltage of the high voltage source 514 does not decrease, it is preferable to correct so that the injection pulse width becomes long. Thus, it is possible to suppress the change in the injection amount caused by the valve opening delay. Such a correction of the injection pulse width is preferably performed by the drive device 150. On the other hand, in the case of setting the pulse width of the injection pulse to the energization time (the injection pulse width 804 in FIG. 8) at which the valve body is closed before the drive current is switched to the holding current, the pulse width of the injection pulse in the case where the voltage of the high voltage source 514 decreases may be corrected so as to be shorter than the pulse width of the injection pulse in the case where the voltage of the high voltage source does not decrease.

Further, the amount of change in the injection amount due to the decrease in the voltage of the high voltage source 514 depends on the voltage value of the high voltage source 514. Therefore, the contact 516 is connected to the IC 502 or the A/D conversion port of the CPU 501 so that the voltage value of the high voltage source 514 which is the output of the boosting circuit 514 can be detected, the relationship between the injection amount, the voltage value of the high voltage source 514, and the injection pulse width is preferably given to the CPU 501 in advance. With such a configuration, it is possible to determine an appropriate injection pulse width Ti from the required injection amount calculated by the CPU 501 and the detected voltage value of the high voltage source 514.

Under a condition of multistage injection, in order to inject the injection amount realized by one injection so far divided into a plurality of injections, it is necessary to reduce the minimum injection amount controllable by one injection. In this case, since the injection amount is limited in the linear region 830, it is necessary to accurately control the injection amount in the region where the injection pulse width Ti is smaller than the point 805.

The injection amount for the injection pulse width Ti from 813 to 814 under a condition that the voltage value of the high voltage source 514 decreases also depends on the current value at the timing at which the injection pulse is turned OFF. Both ends of the resistor 508 or the resistor 513 are connected to the A/D conversion port of the CPU 501 or the IC 502, and current detection means for detecting the current value after the drive current reaches the peak current $I_{peak}$ may be provided. With this configuration, a current is detected immediately before the timing when the injection pulse is stopped, and the current value at timing when the injection pulse is turned OFF can be estimated from the current value.

In the case where the correction of the injection amount with respect to the injection under a condition that the current value is detected after the detection of the current value cannot be made in time, the injection pulse width in the next injection may be corrected so that the injection amount for the amount of change in the injection amount in the previous injection under a condition of the next multistage injection in one combustion cycle is corrected. With such a correction, the total amount of the injection amount during one combustion cycle in the case of performing the multistage injection can be matched between cylinders and for each cycle. Therefore, it is possible to suppress an increase in PN caused by the deviation of the injection amount from the required value.

The relationship between the injection amount, the voltage value of the high voltage source 514, the drive current value, and the injection pulse width Ti may be previously given to the CPU 501 or the IC 502 as MAP information or approximate expression. With such a configuration, the correction amount of the injection pulse is calculated from the estimated current value, and the injection pulse width necessary for achieving the required injection amount can be appropriately determined. As a result, it is possible to suppress variations in the injection amount in a range where the injection pulse width is smaller than the injection pulse width 814 caused by the decrease in the voltage value of the high voltage source 514, thereby accurately controlling the injection amount even under a condition of multistage injection.

The current value at the timing when the injection pulse is turned OFF is influenced by the voltage value of the high voltage source 514 and the resistance value of the solenoid 205. The resistance value of the solenoid 205 increases as the solenoid 205 generates heat. However, under a condition that the injection timing or the injection period between the cylinders overlap due to the multistage injection and the voltage of the high voltage source 514 decreases, the drive cycle of the fuel injection device 540 contributing to the heat generation of the solenoid 205, and the like are equal. Therefore, if the voltage value of the high voltage source 514 can be detected, the current value at the timing when the injection pulse is turned OFF can be estimated. Therefore, the voltage value of the high voltage source 514 may be detected immediately before the fuel injection timing, and the correction amount of the injection pulse width may be determined from the detected value.

When the voltage value of the high voltage source 514 is detected by the CPU 501 and the IC 502, the time resolution of the A/D conversion port is restricted due to limitations of hardware. In this case, it is preferable to detect the voltage value of the high voltage source 514 with the energization timing of the injection pulse calculated by the CPU 501 as a trigger. With such a configuration, it is possible to detect the voltage value of the high voltage source 514 necessary for correcting the injection pulse width at an appropriate timing without increasing the use frequency and the resolution of the A/D conversion port, thereby improving the correction accuracy of the injection amount.

In FIG. 8, the injection amount deviation is indicated by the ratio of the injection amount $Q_{802}$ in the case where the voltage with respect to the injection amount $Q_{801}$ in the case where the voltage of the high voltage source 514 does not decrease decreases. Therefore, an injection amount deviation 860 is larger than the injection amount deviation 840. However, in the region where the injection amount deviation 840 occurs, since the injection amount $Q_{801}$ is larger than the injection amount $Q_{802}$, the absolute value of the correction amount of the injection pulse width necessary for correcting the injection amount deviation 860 becomes smaller than the absolute value of the correction amount of the injection pulse width necessary for correcting the injection amount deviation 840. Therefore, the absolute value of the correction amount of the injection pulse width necessary for correcting the injection amount deviation 860 in the injection pulse width 813 and further correcting the injection amount so as to match the one-dot chain line 820 extrapolated from the linear region 830 is smaller than the absolute value of the correction amount of the injection pulse width necessary for correcting the injection amount deviation 840 (the correction amount of the injection pulse width necessary for matching the injection amount $Q_{801}$).

Therefore, in a region where the injection pulse width is smaller than the injection pulse width 814 as compared with the region in which the injection pulse width is larger than the injection pulse width 814, it is preferable to correct so that the absolute value of the correction amount of the injection pulse width in the case where the voltage of the high voltage source 514 decreases becomes small. By switching the correction amount of the injection pulse width in this way, it is possible to suppress variation in the injection amount caused by the fact that voltage of the high voltage source 514 decreases in the range from the linear region 830 to the region where the injection pulse width is small.

This means that in the case of setting the pulse width of the injection pulse to the energization time (for example, the injection pulse width 813 in FIG. 8) at which the valve body is closed before the drive current is switched to the holding current, the absolute value of the correction amount of the pulse width of the injection pulse is lower than when the pulse width of the injection pulse is set to the energization time at which the valve body is closed after the drive current is switched to the holding current (for example, the injection pulse width 815 in FIG. 8)

Also, from 604, under a condition that the injection interval of the compression stroke injection of the first cylinder is small or the injection interval of the intake stroke injection of the third cylinder is small, even when the injection timing and the injection period do not overlap in the first cylinder and the third cylinder, fuel injection may be performed under a condition that the voltage of the high voltage source 514 decreases. In this case, even if the boosting circuit 514 is configured for each cylinder, fuel injection is performed under a condition that the voltage of the high voltage source 514 decreases; therefore, variation in the injection amount occurs in the first injection and the second injection during the corresponding stroke. Even in such a case, it is possible to suppress variation in the injection amount by correcting the injection pulse width described in FIGS. 6, 7, 8, and 9.

Next, with reference to FIGS. 10 and 11, a description will be given of a variation correction method of the injection timing when the voltage value of the high voltage source 514 decreases. In the valve body displacement amount shown in FIG. 10, the valve body displacement amount in the case where the voltage value of the high voltage source 514 at the timing when the injection pulse is turned ON becomes a boosted voltage VH that is an initial value and under a condition that the fuel pressure is small is indicated by 1001, and the valve body displacement amount under a condition that the fuel pressure is high is indicated by 1003. Furthermore, in FIG. 10, the valve body displacement amount in the case where the voltage value of the high voltage source 514 at the timing when the injection pulse is turned ON is lower than the initial value and under a condition that the fuel pressure is small is shown at 1002, and the valve body displacement amount under a condition that the fuel pressure is high is shown at 1004. For the three conditions with different fuel pressures shown in FIG. 11, it is assumed that fuel pressures are 1101, 1102, and 1103 in descending order.

As described in FIG. 7, when the voltage value of the high voltage source 514 decreases from the initial value and the voltage applied to the solenoid 205 decreases, the valve opening start timing of the valve body 214 is delayed, and the fuel injection timing is delayed. For example, when the injection timing of fuel is delayed under the condition of fuel injection in the compression stroke, the fuel spray easily adheres to the piston, and the formation state of the fuel spray is changed, so that the homogeneity of the spray decreases. Attachment of the fuel spray to the piston and decrease in homogeneity of the spray can lead to an increase in PN.

Further, even in the condition of fuel injection in the intake stroke, the fuel injection timing is delayed, so that the timing of fuel injection is delayed with respect to the opening/closing timing of the intake valve. The homogeneity of the air-fuel mixture of the air flowing into the piston cylinder and the injected fuel varies for each cylinder or for each injection of multistage injection, so that the PN may increase.

In order to suppress variation in the fuel injection timing due to a decrease in the voltage value of the high voltage source 514, preferably, the voltage value of the high voltage source 514 or the current flowing through the solenoid 205 is detected by the CPU 502 or the IC 501, and the amount of decrease from the voltage value of the high voltage source 514 or the boosted voltage VH is calculated from the detected value to correct the energization timing of the injection pulse.

As indicated by 1102 in FIG. 11, the relationship between the voltage value of the high voltage source 514 and the fuel injection timing is substantially linear. The relationship between the voltage value of the high voltage source 514 and the injection timing is preferably given to the CPU 501 in advance. With such a configuration, by determining the appropriate injection timing from the detected voltage of the high voltage source 514 and making the energization timing (application timing) of the energizing pulse faster by the amount of deviation from the reference value, it is possible to accurately correct variations in the injection timing.

In addition, the valve body 214 starts valve opening at the timing when the magnetic attraction force acting on the mover 102 exceeds the force in the valve closing direction acting on the valve body 214 and the mover 102. The magnetic attraction force acting on the mover 102 is determined by the current value $I_{so}$ flowing in the solenoid 205. Assuming that the voltage value of the high voltage source 514 is $V_{Hi}$ and the resistance value of the solenoid 205 is $R_{SO}$, the current value $I_{so}$ is obtained by $I_{so}=V_{Hi}/R_{SO}$ according to Ohm's law. Since the resistance value $R_{SO}$ of the solenoid 205 varies with the heat generation of the solenoid 205, by detecting the current Iso, the calculation accuracy of the correction value of the energization timing can be improved, as compared with the case where the energization timing is corrected only with the voltage value $V_{Hi}$ of the high voltage source. As a result, the correction accuracy of the valve opening start timing of the valve body 214 can be enhanced, and the effect of suppressing PN is enhanced.

In the correction of energization timing by the current value, it is preferable to detect the current value before the valve body 214 starts to open after the start of energization to the solenoid 205, and to determine the correction amount of energization timing according to the detected current value. In the detection of the current value, it is preferable to use the energization timing as a trigger. With such a configuration, since it is possible to reliably detect the current value after energization of the solenoid 205 is started, the calculation precision of the correction amount of energization timing is improved and the correction accuracy of the valve opening start timing can be enhanced.

Furthermore, the current value Iso during the period from the start of the energization to the solenoid 205 until the valve body 214 opens is detected at two or more points, and the correction amount of energization timing may be determined using the inclination of the current value Iso, that is, time differentiation or an approximate expression. With such a configuration, the influence of the detection error of the current Iso can be reduced as compared with the case of detecting one point of the current value Iso, so that it is possible to improve the correction accuracy of the valve opening start timing.

The relationship between the voltage value and the drive current of the high voltage source 514 and the correction amount of the energization timing of the injection pulse may be previously given to the CPU 501 as MAP data or an approximate expression. The energization timing can be appropriately determined from the current value detected by such a configuration and the voltage value of the high voltage source 514, and variation in the injection timing can be suppressed.

Furthermore, the delay in the energization timing of the injection pulse when the voltage value of the high voltage source 514 decreases is influenced by the fuel pressure supplied to the fuel injection device 540. Under the condition of 1101 having a high fuel pressure with respect to 1102 or 1103 having a small fuel pressure, the sensitivity of the change in the fuel injection timing due to the decrease in the voltage value of the high voltage source 514 is different. The higher the fuel pressure, the larger the inclination of the fuel injection timing with respect to the voltage value of the high voltage source 514. In the closed state of the valve body 214, the force in the valve closing direction acting on the valve body 214 when the fuel pressure is small is indicated by 1007, and the force in the valve closing direction acting on the valve body 214 when the fuel pressure is high is indicated by 1006.

In a state where the valve body 214 is closed, the resultant force of the fluid force obtained by multiplying the cross sectional area of the diameter of the valve body 214 and the valve seat 218 by the fuel pressure and the spring load 210 acts as the force in the valve closing direction. When the injection pulse is turned ON, a drive current is supplied to the solenoid 205, and a magnetic attraction force acts on the mover 202 with a time delay due to the influence of the eddy current. Under a condition that the voltage value of the high voltage source 514 does not decrease under the condition of 1007 where the fuel pressure is low, as indicated by 1001, the valve body 214 starts to open after the timing $t_{102}$ at which the magnetic attraction force exceeds the force 1007 in the valve closing direction. Under a condition that the voltage value of the high voltage source 514 decreases, the valve body 214 starts to open after the timing $t_{103}$ as indicated by 1002.

Here, a difference in the valve opening start timing between the case where the voltage of the high voltage source 514 does not decrease and the case where the voltage of the high voltage source 514 decreases under the condition of 1007 where the fuel pressure is low is set to 1010. Also, a difference in the valve opening start timing between the case where the voltage of the high voltage source 514 does not decrease and the case where the voltage of the high voltage source 514 decreases under the condition of 1006 where the fuel pressure is high is set to 1011. As shown in FIG. 10, the valve opening start timing difference 1011 is larger than the valve opening start timing difference 1010.

The magnetic attraction force acting on the mover 202 depends on the energy of the drive current, that is, the time integral value of the drive current. As the voltage value of the high voltage source 514 decreases, the inclination of the drive current decreases and the inclination of the magnetic attraction force also decreases. Compared to the condition of 1007 in which the fuel pressure is small due to the difference in inclination, the delay of the valve opening start timing and the injection timing in the case where the voltage of the high voltage source 514 decreases is larger in 1006 where the fuel pressure is higher. Therefore, by detecting the fuel pressure supplied to the fuel injection device 540 detected, and determining the energization timing for correcting the injection timing according to the fuel pressure and the voltage value of the high voltage source 514, it is possible to suppress variations in the injection timing.

Furthermore, by connecting the signal from the pressure sensor 102 to the A/D conversion port of the CPU 501, it is preferable to provide pressure signal detection means for detecting the fuel pressure. The detection of the fuel pressure may be carried out by detecting the fuel pressure at timing before the trigger, with the energization timing of the injection pulse calculated by the CPU 501 as a trigger. When the pressure drops due to the fuel injection, the pressure in a rail piping 133 fluctuates, and the pressure detected by disconnecting the pressure sensor 102 also varies. By detecting the fuel pressure before the fuel injection, it is possible to accurately detect the fuel pressure immediately before the valve opening timing of the valve body 214 which contributes to the change in the injection timing, thereby accurately calculating the correction amount of the energization timing. As a result, variation in injection timing can be suppressed, and the effect of suppressing PN is enhanced.

Example 2

Figure 12:
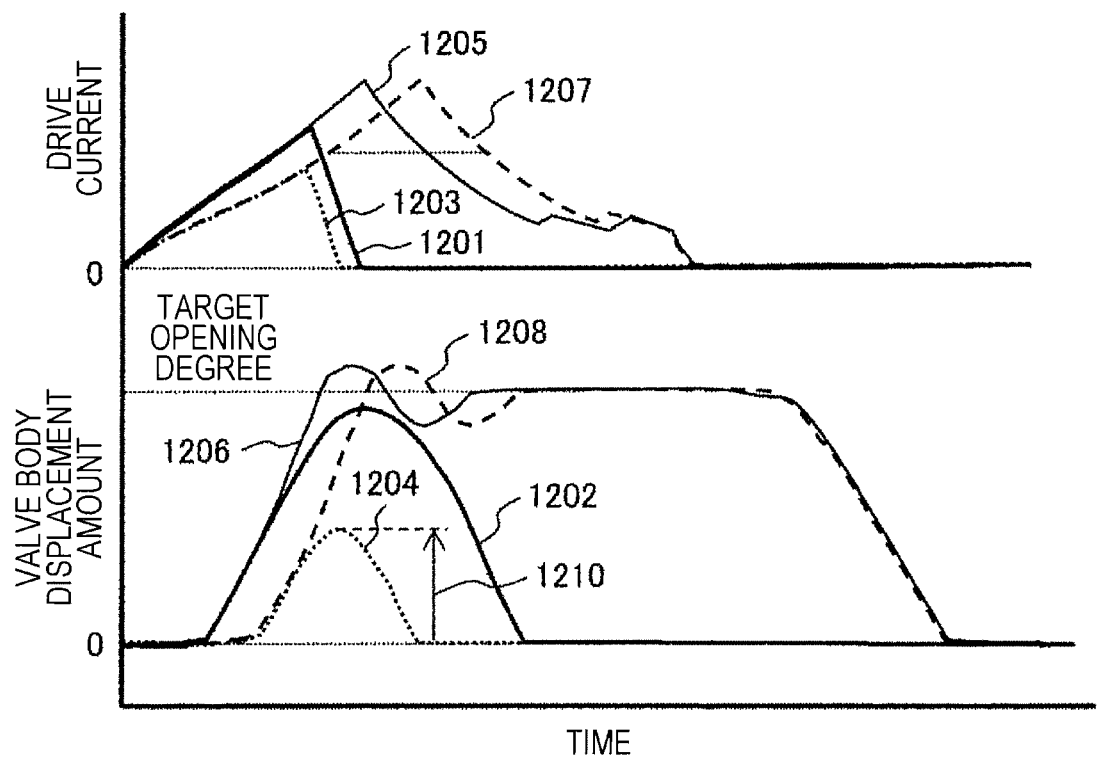
FIG. 12 is a view showing, in a case where a voltage value of a high voltage source does not decrease and a case where the voltage value decreases, a drive current and a valve body displacement amount at an injection pulse width at a point 815 in FIG. 8, and a drive current and a valve body displacement amount at an injection pulse width at a point 802, for a drive device for a fuel injection device according to a second embodiment.

With reference to FIGS. 8 and 12, a method of correcting the injection amount variation in the second embodiment of the present invention will be described. The fuel injection device and the drive device in the present embodiment have the same configuration as in the first embodiment. FIG. 12 is a view showing, in a case where a voltage value of a high voltage source does not decrease and a case where the voltage value decreases, a drive current and a valve body displacement amount at an injection pulse width at a point 815 in FIG. 8, and a drive current and a valve body displacement amount at an injection pulse width at a point 802, for a drive device for a fuel injection device according to a second embodiment.

In FIG. 12, at the injection pulse width at the point 802 in FIG. 8, a drive current waveform in the case where the voltage of the high voltage source 514 does not decrease compared with the initial value (boosted voltage VH) is indicated by 1201, a valve body displacement amount is indicated by 1202, and a current waveform when the voltage of the high voltage source 514 decreases compared with the initial value is indicated by 1203, and a valve body displacement amount is indicated by 1204. Furthermore, at the injection pulse width at the point 815, a current waveform in the case where the voltage of the high voltage source 514 does not decrease compared with the initial value is indicated by 1205, a displacement amount of the valve body is indicated by 1206, and a current waveform when the voltage of the high voltage source 514 decreases compared with the initial value is indicated by 1207, and a valve body displacement amount is indicated by 1208.

First, a method of correcting the injection amount in the region where the injection pulse width is smaller than the point 802 will be described. With the injection pulse width at the point 802, valve closing starts immediately before reaching the target opening degree, and the locus of the valve body 214 becomes parabolic motion. In other words, within the range of the pulse width of the point 802 or less, the valve body 214 is driven under the condition of the half lift in which the valve body 214 is closed without reaching the target opening degree. Under this condition, the valve body displacement amount increases along with the valve closing delay time according to the injection pulse as compared with a condition that the energization is stopped after the valve body 214 reaches the target opening degree; therefore, the sensitivity of the injection pulse width to the injection amount is high. As a result, in comparison with the condition that the valve body 214 reaches the target opening degree and starts closing, under the condition of half lift, when the voltage of the high voltage source 514 decreases from the initial value boosted voltage VH, it is preferable to correct the correction amount of the injection pulse width to a large extent as compared with the case where the voltage does not decrease.

Also, under the condition of half lift, in the case where the voltage of the high voltage source 514 decreases from the initial boosted voltage VH, the drive current value at the timing of stopping energization is lower than when the voltage does not decrease. Furthermore, when the voltage of the high voltage source 514 decreases from the initial boosted voltage VH, the kinetic energy of the valve body 214 and the mover 202 is small at the timing of stopping energization as the valve opening start timing is delayed, as compared with the case where the valve body 214 and the mover 202 do not decrease. From these facts, the maximum value 1210 of the displacement amount of the valve body 214 becomes small. Therefore, under a condition that the valve body 214 is driven by the half lift, when the voltage of the high voltage source 514 decreases from the initial boosted voltage VH, by correcting so that the injection pulse width becomes larger than when not decreasing, variation in the injection amount can be suppressed, so that it is possible to improve the correction accuracy of the injection amount.

It should be noted that the present invention is not limited to the embodiments described above, but includes various modified examples. For example, the above-described embodiments have been described in detail in order to explain the present invention in an easy-to-understand manner, and are not necessarily limited to those having all the configurations. In addition, it is possible to replace part of the configuration of one embodiment with the configuration of another embodiment, and the configuration of another embodiment can be added to the configuration of one embodiment. Furthermore, it is possible to add, delete and replace other configurations with respect to part of the configuration of each embodiment.

REFERENCE SIGNS LIST

101A, 101B, 101C, 101D Fuel injection device
102 Pressure sensor
103 Drive circuit
104 Engine control unit (ECU)
150 Drive device
202 Mover
205 Solenoid
207 Fixed core
210 Spring
212 Return spring
214 Valve body
218 Valve seat
219 Fuel injection hole
401 High voltage
402 Current
403 Holding current
404 Predetermined current value
501 CPU
502 Driving IC
503 Communication line
505, 506, 507 Switching element
508 Resistance
509, 510, 511 Diode
512, 513 Resistance
514 Boosting circuit (high voltage source)
515 Contact potential
530 Coil
531 Transistor
532 Diode
533 Capacitor
535 Diode
540 Fuel injection device
550, 551, 580, 581, 552, 553 Wiring
590 Power source side terminal of solenoid 205
710 Drive current of third cylinder
711 Valve body displacement amount of third cylinder
712 Drive current of first cylinder
713 Valve body displacement amount of first cylinder
830 Linear area (linear area)
910 Drive current when voltage value of high voltage source 514 does not decrease
911 Valve body displacement amount when voltage value of high voltage source 514 does not decrease
912 Drive current when voltage of high voltage source 514 decreases
913 Valve body displacement amount when voltage of high voltage source 514 decreases
1001 Valve body displacement amount when voltage value of high voltage source 514 is boosted voltage VH and under condition that fuel pressure is small
1002 Valve body displacement amount when voltage value of high voltage source 514 decreases from initial value and under condition that fuel pressure is small
1003 Valve body displacement amount when voltage value of high voltage source 514 is boosted voltage VH and under condition that fuel pressure is high
1004 Valve body displacement amount when voltage value of high voltage source 514 decreases from initial value and under condition that fuel pressure is high
1010, 1011 Difference in valve opening start timing
1101, 1102, 1103 Relationship between voltage value of high voltage source 514 and fuel injection timing under three conditions of different fuel pressures

The invention claimed is:

1. A drive device for an electromagnetic fuel injection device to inject fuel by driving a valve body employing a magnetic attraction force generated by energizing a solenoid, the drive device comprising a function of:
   controlling a time for energization supplied to the solenoid from a voltage source with a pulse width of an injection pulse;
   correcting the pulse width of the injection pulse when a voltage of the voltage source is a second voltage lower than a first voltage to be longer than the pulse width of the injection pulse when the voltage of the voltage source is the first voltage; and
   making a correction amount of the pulse width of the injection pulse, when the valve body is controlled such that it starts to close before reaching a target opening degree since beginning to open, larger than the correction amount of the pulse width of the injection pulse when the valve body is controlled such that it starts to close after reaching the target opening degree.

2. A drive device for an electromagnetic fuel injection device to inject fuel by driving a valve body employing a magnetic attraction force generated by energizing a solenoid, the drive device comprising a function of:
   controlling a time for energization supplied to the solenoid from a voltage source with a pulse width of an injection pulse;
   correcting the pulse width of the injection pulse when a voltage of the voltage source is a second voltage lower than a first voltage to be longer than the pulse width of the injection pulse when the voltage of the voltage source is the first voltage; and making a correction amount of the pulse width of the injection pulse, when a peak current to open the valve body is cut off during a peak current supply period in which the peak current is supplied to the solenoid based on a drive voltage applied from the voltage source, larger than the correction amount of the pulse width of the injection pulse when a holding current smaller in current value than the peak current is cut off during a holding current supply period in which the holding current is supplied to the solenoid.

3. A drive device for an electromagnetic fuel injection device to inject fuel by driving a valve body employing a magnetic attraction force generated by energizing a solenoid, the drive device being configured to control a drive voltage applied from a voltage source to the solenoid to supply a drive current to the solenoid, the drive device comprising a function of:

correcting one of the drive voltage and the drive current to increase an injection amount of the fuel when a voltage of the voltage source is a second voltage lower than a first voltage in comparison with a case where the voltage of the voltage source is the first voltage; and correcting one of the drive voltage and the drive current to make an increased injection amount of the fuel according to the correction under a half lift condition in which the valve body closes before reaching a target opening degree larger than the increased injection amount of the fuel according to the correction under a full lift condition in which the valve body closes after reaching the target opening degree.

4. The drive device for an electromagnetic fuel injection device according to claim 1, the drive device comprising a function of correcting an energization start timing to the solenoid when the voltage of the voltage source is the second voltage to be earlier than the energization start timing to the solenoid when the voltage of the voltage source is the first voltage.

5. The drive device for an electromagnetic fuel injection device according to claim 2, the drive device comprising a function of correcting an energization start timing to the solenoid when the voltage of the voltage source is the second voltage to be earlier than the energization start timing to the solenoid when the voltage of the voltage source is the first voltage.

6. The drive device for an electromagnetic fuel injection device according to claim 3, the drive device comprising a function of correcting an energization start timing to the solenoid when the voltage of the voltage source is the second voltage to be earlier than the energization start timing to the solenoid when the voltage of the voltage source is the first voltage.

7. The drive device for an electromagnetic fuel injection device according to claim 1, the drive device comprising a function of correcting an energization start timing to the solenoid when a pressure of an injected fuel is a first pressure to be earlier than the energization start timing to the solenoid when the pressure of the injected fuel is a second pressure smaller than the first pressure.

8. The drive device for an electromagnetic fuel injection device according to claim 2, the drive device comprising a function of correcting an energization start timing to the solenoid when a pressure of an injected fuel is a first pressure to be earlier than the energization start timing to the solenoid when the pressure of the injected fuel is a second pressure smaller than the first pressure.

9. The drive device for an electromagnetic fuel injection device according to claim 3, the drive device comprising a function of correcting an energization start timing to the solenoid when a pressure of an injected fuel is a first pressure to be earlier than the energization start timing to the solenoid when the pressure of the injected fuel is a second pressure smaller than the first pressure.

10. The drive device for an electromagnetic fuel injection device according to claim 1, wherein the voltage source is provided with a boosting circuit to boost a battery voltage.

11. The drive device for an electromagnetic fuel injection device according to claim 2, wherein the voltage source is provided with a boosting circuit to boost a battery voltage.

12. The drive device for an electromagnetic fuel injection device according to claim 3, wherein the voltage source is provided with a boosting circuit to boost a battery voltage.

13. The drive device for an electromagnetic fuel injection device according to claim 1, wherein the drive device controls drive of the fuel injection device provided in each of a plurality of cylinders.

14. The drive device for an electromagnetic fuel injection device according to claim 2, wherein the drive device controls drive of the fuel injection device provided in each of a plurality of cylinders.

15. The drive device for an electromagnetic fuel injection device according to claim 3, wherein the drive device controls drive of the fuel injection device provided in each of a plurality of cylinders.

16. The drive device for an electromagnetic fuel injection device according to claim 1, wherein a fuel injection during one combustion stroke is performed while being divided into a plurality of times.

17. The drive device for an electromagnetic fuel injection device according to claim 2, wherein a fuel injection during one combustion stroke is performed while being divided into a plurality of times.

18. The drive device for an electromagnetic fuel injection device according to claim 3, wherein a fuel injection during one combustion stroke is performed while being divided into a plurality of times.

* * * * *